United States Patent
Eccleston et al.

(10) Patent No.: US 11,132,107 B2
(45) Date of Patent: *Sep. 28, 2021

(54) NATIVE APPLICATION COLLABORATION

(71) Applicant: Dropbox, Inc., San Francisco, CA (US)

(72) Inventors: Matthew Eccleston, San Francisco, CA (US); Robert Baesman, Belmont, CA (US); Sang Tian, San Francisco, CA (US)

(73) Assignee: Dropbox, Inc., San Francisco, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/257,503

(22) Filed: Jan. 25, 2019

(65) Prior Publication Data

US 2019/0155471 A1 May 23, 2019

Related U.S. Application Data

(63) Continuation of application No. 15/810,006, filed on Nov. 11, 2017, now Pat. No. 10,235,022, which is a
(Continued)

(51) Int. Cl.
*G06F 3/0484* (2013.01)
*G06F 3/0481* (2013.01)
(Continued)

(52) U.S. Cl.
CPC .......... *G06F 3/0484* (2013.01); *G06F 3/0481* (2013.01); *G06F 40/166* (2020.01); *G06F 40/197* (2020.01)

(58) Field of Classification Search
CPC ............. G06F 40/10–197; G06F 3/048; G06F 3/0481–0486; G06F 40/166–186;
(Continued)

(56) References Cited

U.S. PATENT DOCUMENTS

| 5,337,407 A | 8/1994 | Bates et al. |
| 5,960,173 A | 9/1999 | Tang et al. |

(Continued)

FOREIGN PATENT DOCUMENTS

| CN | 102342080 A | 2/2012 |
| JP | H06214743 A | 8/1994 |

(Continued)

OTHER PUBLICATIONS

"Operational Transformation," Wikipedia, Last Modified Oct. 28, 2013, 8 pages, [Online] [Retrieved on Jan. 6, 2014] Retrieved from the Internet<URL:http://en.wikipedia.org/wiki/Operational_transforma- tion>.
(Continued)

*Primary Examiner* — Liang Y Li
(74) *Attorney, Agent, or Firm* — Fenwick & West LLP

(57) ABSTRACT

A secondary device receives presence information for a content item that is synchronized by a content management system with the secondary device and with a primary device. If a user of the primary device is present as indicated by the presence information, a collaboration element is displayed on the secondary device. Responsive to a user input at the collaboration element, a collaboration request is sent to the primary device, and collaboration information enabling collaborative interaction with an instance of the content item on the primary device is received.

20 Claims, 19 Drawing Sheets

Related U.S. Application Data continuation of application No. 14/635,192, filed on Mar. 2, 2015, now Pat. No. 9,846,528.

(51) Int. Cl.
*G06F 40/166* (2020.01)
*G06F 40/197* (2020.01)

(58) Field of Classification Search
CPC ...... G06F 40/197; G06F 16/176–1774; G06Q 10/10; G06Q 10/101; H04L 51/043; H04L 67/22–24
See application file for complete search history.

(56) References Cited

U.S. PATENT DOCUMENTS

| | | | |
|---|---|---|---|
| 6,065,026 | A | 5/2000 | Cornelia et al. |
| 6,088,707 | A | 7/2000 | Bates et al. |
| 6,260,040 | B1 | 7/2001 | Kauffman et al. |
| 6,938,042 | B2 | 8/2005 | Aboulhosn et al. |
| 7,089,307 | B2 | 8/2006 | Zintel et al. |
| 7,386,529 | B2 | 6/2008 | Kiessig et al. |
| 7,401,104 | B2 | 7/2008 | Shah et al. |
| 7,496,633 | B2 | 2/2009 | Szeto et al. |
| 7,533,134 | B2 | 5/2009 | Terry et al. |
| 7,558,797 | B2 | 7/2009 | Li |
| 7,603,357 | B1 | 10/2009 | Gourdol et al. |
| 7,610,280 | B2 | 10/2009 | O'Toole et al. |
| 7,620,659 | B2 | 11/2009 | Novik et al. |
| 7,631,007 | B2 | 12/2009 | Morris et al. |
| 7,640,506 | B2 | 12/2009 | Pratley et al. |
| 7,676,526 | B1 | 3/2010 | Beloussov et al. |
| 7,769,810 | B1 | 8/2010 | Kaufman |
| 7,818,419 | B1 | 10/2010 | McAllister et al. |
| 7,822,711 | B1 | 10/2010 | Ranade |
| 7,912,916 | B2 | 3/2011 | Rakowski et al. |
| 8,019,877 | B2 | 9/2011 | Li et al. |
| 8,041,807 | B2 | 10/2011 | Bao et al. |
| 8,055,644 | B2 | 11/2011 | Crowley et al. |
| 8,086,698 | B2 | 12/2011 | Rakowski et al. |
| 8,140,513 | B2 | 3/2012 | Ghods et al. |
| 8,156,078 | B2 | 4/2012 | Tsinman et al. |
| 8,230,348 | B2 | 7/2012 | Peters et al. |
| 8,244,830 | B2 | 8/2012 | Robinson et al. |
| 8,301,606 | B2 | 10/2012 | Futatsugi et al. |
| 8,386,558 | B2 | 2/2013 | Schleifer et al. |
| 8,452,959 | B2 | 5/2013 | Brown et al. |
| 8,468,132 | B1 | 6/2013 | O'Neill et al. |
| 8,495,015 | B2 | 7/2013 | Freedman |
| 8,521,732 | B2 | 8/2013 | Wood et al. |
| 8,543,637 | B2 | 9/2013 | Kent et al. |
| 8,555,177 | B1 | 10/2013 | Junee et al. |
| 8,600,934 | B2 | 12/2013 | Strong et al. |
| 8,615,552 | B2 | 12/2013 | Shah et al. |
| 8,635,209 | B2 | 1/2014 | Freedman |
| 8,655,840 | B2 | 2/2014 | Simelius et al. |
| 8,700,759 | B2 | 4/2014 | Chakra et al. |
| 8,719,225 | B1 | 5/2014 | Rath |
| 8,825,597 | B1 | 9/2014 | Houston et al. |
| 8,843,441 | B1 | 9/2014 | Rath et al. |
| 8,868,500 | B2 | 10/2014 | Giampaolo et al. |
| 8,930,312 | B1 | 1/2015 | Rath et al. |
| 8,930,488 | B2 | 1/2015 | Dantec et al. |
| 8,997,007 | B1* | 3/2015 | Bennett .............. H04N 21/4788 715/753 |
| 9,021,113 | B2 | 4/2015 | Carr et al. |
| 9,053,165 | B2 | 6/2015 | Van Rossum |
| 9,240,962 | B2 | 1/2016 | Jung et al. |
| 9,280,613 | B2 | 3/2016 | Smith et al. |
| 9,298,355 | B1 | 3/2016 | Beausoleil et al. |
| 9,298,834 | B2 | 3/2016 | Kleppner et al. |
| 9,307,006 | B2 | 4/2016 | Micucci et al. |
| 9,338,242 | B1 | 5/2016 | Suchland et al. |
| 9,432,457 | B2 | 8/2016 | Marano et al. |
| 9,519,886 | B2 | 12/2016 | Berger et al. |
| 9,575,981 | B2 | 2/2017 | Dorman et al. |
| 9,602,560 | B1* | 3/2017 | Moody .............. H04L 65/1069 |
| 9,614,880 | B1* | 4/2017 | Davis ................ H04L 67/26 |
| 9,646,023 | B1 | 5/2017 | McCabe |
| 9,652,741 | B2 | 5/2017 | Goldberg et al. |
| 9,690,785 | B1 | 6/2017 | Vagell |
| 9,773,010 | B1 | 9/2017 | Ganesh et al. |
| 9,773,051 | B2 | 9/2017 | Smith |
| 9,832,237 | B2 | 11/2017 | Lock et al. |
| 9,998,555 | B2 | 6/2018 | Larabie-Belanger |
| 10,091,287 | B2 | 10/2018 | Larabie-Belanger |
| 10,133,720 | B2 | 11/2018 | Rothschiller et al. |
| 10,171,579 | B2 | 1/2019 | Larabie-Belanger |
| 10,235,022 | B2 | 3/2019 | Eccleston et al. |
| 10,270,871 | B2 | 4/2019 | Larabie-Belanger |
| 10,318,492 | B2 | 6/2019 | Eisner |
| 2001/0042073 | A1 | 11/2001 | Saether et al. |
| 2002/0049786 | A1* | 4/2002 | Bibliowicz ............ G06Q 10/10 715/211 |
| 2003/0018719 | A1 | 1/2003 | Ruths et al. |
| 2003/0112273 | A1 | 6/2003 | Hadfield et al. |
| 2003/0159136 | A1 | 8/2003 | Huang et al. |
| 2004/0021686 | A1 | 2/2004 | Barberis |
| 2004/0024795 | A1 | 2/2004 | Hind et al. |
| 2004/0058710 | A1 | 3/2004 | Timmins et al. |
| 2004/0199514 | A1 | 10/2004 | Rosenblatt et al. |
| 2004/0221010 | A1* | 11/2004 | Butler .................. G06F 3/038 709/204 |
| 2005/0022210 | A1 | 1/2005 | Zintel et al. |
| 2005/0044187 | A1 | 2/2005 | Jhaveri et al. |
| 2005/0223047 | A1 | 10/2005 | Shah et al. |
| 2005/0246544 | A1 | 11/2005 | Moore et al. |
| 2005/0278392 | A1 | 12/2005 | Hansen et al. |
| 2006/0004911 | A1 | 1/2006 | Becker et al. |
| 2006/0101064 | A1 | 5/2006 | Strong et al. |
| 2006/0190117 | A1 | 8/2006 | Weczorek et al. |
| 2006/0235984 | A1 | 10/2006 | Kraus et al. |
| 2006/0259957 | A1* | 11/2006 | Tam .................... G06F 21/10 726/3 |
| 2006/0288053 | A1 | 12/2006 | Holt et al. |
| 2007/0027853 | A1 | 2/2007 | Hajela et al. |
| 2007/0168490 | A1 | 7/2007 | Kent et al. |
| 2007/0174787 | A1 | 7/2007 | Rhee et al. |
| 2007/0271502 | A1 | 11/2007 | Bedi et al. |
| 2008/0005188 | A1 | 1/2008 | Li et al. |
| 2008/0005235 | A1 | 1/2008 | Hegde et al. |
| 2008/0109547 | A1 | 5/2008 | Bao et al. |
| 2008/0178117 | A1 | 7/2008 | Gelman et al. |
| 2008/0195759 | A1 | 8/2008 | Novik et al. |
| 2008/0222296 | A1 | 9/2008 | Lippincott et al. |
| 2008/0243807 | A1 | 10/2008 | Gaucas et al. |
| 2008/0244418 | A1 | 10/2008 | Manolescu et al. |
| 2008/0307102 | A1 | 12/2008 | Galloway et al. |
| 2009/0006498 | A1 | 1/2009 | Freedman |
| 2009/0113412 | A1 | 4/2009 | Shribman et al. |
| 2009/0138808 | A1 | 5/2009 | Moromisato et al. |
| 2009/0157627 | A1 | 6/2009 | Arthursson |
| 2009/0222763 | A1 | 9/2009 | Dukhon et al. |
| 2009/0228504 | A1 | 9/2009 | Brown et al. |
| 2009/0249224 | A1 | 10/2009 | Davis et al. |
| 2009/0271696 | A1 | 10/2009 | Bailor et al. |
| 2009/0271708 | A1 | 10/2009 | Peters et al. |
| 2009/0288150 | A1 | 11/2009 | Toomim et al. |
| 2009/0292681 | A1 | 11/2009 | Wood et al. |
| 2009/0292709 | A1 | 11/2009 | Tsinman et al. |
| 2009/0313311 | A1 | 12/2009 | Hoffmann et al. |
| 2009/0327358 | A1 | 12/2009 | Lukiyanov et al. |
| 2010/0017879 | A1 | 1/2010 | Kuegler et al. |
| 2010/0131868 | A1 | 5/2010 | Chawla et al. |
| 2010/0138387 | A1 | 6/2010 | Simelius |
| 2010/0191884 | A1 | 7/2010 | Holenstein et al. |
| 2010/0198784 | A1 | 8/2010 | Serlet |
| 2010/0198874 | A1 | 8/2010 | Futatsugi et al. |
| 2010/0251340 | A1 | 9/2010 | Martin et al. |
| 2010/0257450 | A1* | 10/2010 | Go ..................... H04L 67/38 715/733 |
| 2010/0257457 | A1 | 10/2010 | De Goes |
| 2010/0281384 | A1* | 11/2010 | Lyons .................. H04L 67/06 715/723 |

(56) References Cited

U.S. PATENT DOCUMENTS

| | | | |
|---|---|---|---|
| 2011/0055177 A1 | 3/2011 | Chakra et al. |
| 2011/0106880 A1 | 5/2011 | Strong et al. |
| 2011/0113092 A1 | 5/2011 | Rakowski et al. |
| 2011/0208805 A1 | 8/2011 | Kasetty et al. |
| 2011/0231499 A1 | 9/2011 | Stovicek et al. |
| 2011/0296042 A1 | 12/2011 | Li et al. |
| 2012/0005159 A1 | 1/2012 | Wang et al. |
| 2012/0054279 A1 | 3/2012 | Dantec et al. |
| 2012/0089710 A1 | 4/2012 | Rakowski et al. |
| 2012/0101980 A1 | 4/2012 | Taleghani et al. |
| 2012/0124486 A1 | 5/2012 | Robinson et al. |
| 2012/0130953 A1 | 5/2012 | Hind et al. |
| 2012/0151495 A1 | 6/2012 | Burckhardt et al. |
| 2012/0185434 A1 | 7/2012 | Giampaolo et al. |
| 2012/0227059 A1 | 9/2012 | Fleming |
| 2012/0233554 A1 | 9/2012 | Vagell et al. |
| 2012/0278127 A1 | 11/2012 | Kirakosyan et al. |
| 2012/0303716 A1 | 11/2012 | Peters et al. |
| 2012/0317239 A1 | 12/2012 | Mulder et al. |
| 2012/0324121 A1 | 12/2012 | Carr et al. |
| 2012/0331108 A1 | 12/2012 | Ferdowsi et al. |
| 2013/0006947 A1 | 1/2013 | Akinyemi et al. |
| 2013/0013560 A1 | 1/2013 | Goldberg et al. |
| 2013/0054509 A1 | 2/2013 | Kass et al. |
| 2013/0060859 A1 | 3/2013 | Olsen et al. |
| 2013/0091205 A1 | 4/2013 | Kotler et al. |
| 2013/0117376 A1 | 5/2013 | Filman et al. |
| 2013/0124638 A1 | 5/2013 | Barreto et al. |
| 2013/0124967 A1 | 5/2013 | Hatfield et al. |
| 2013/0124978 A1 | 5/2013 | Horns et al. |
| 2013/0138608 A1 | 5/2013 | Smith |
| 2013/0151596 A1 | 6/2013 | Strong et al. |
| 2013/0185651 A1* | 7/2013 | Wionzek | G06Q 10/101 |
| | | | 715/753 |
| 2013/0191339 A1 | 7/2013 | Haden et al. |
| 2013/0191451 A1 | 7/2013 | Tse et al. |
| 2013/0204841 A1 | 8/2013 | Obusek |
| 2013/0212250 A1 | 8/2013 | Kleppner et al. |
| 2013/0212480 A1 | 8/2013 | Ben-Shaul et al. |
| 2013/0247004 A1* | 9/2013 | DeLuca | G06F 8/71 |
| | | | 717/120 |
| 2013/0254656 A1 | 9/2013 | Florian et al. |
| 2013/0275509 A1 | 10/2013 | Micucci et al. |
| 2013/0282656 A1 | 10/2013 | O'Neill et al. |
| 2013/0297680 A1 | 11/2013 | Smith et al. |
| 2013/0332523 A1 | 12/2013 | Luu et al. |
| 2014/0019626 A1 | 1/2014 | Hubler et al. |
| 2014/0040202 A1 | 2/2014 | Hagan et al. |
| 2014/0101310 A1 | 4/2014 | Savage et al. |
| 2014/0156749 A1 | 6/2014 | Kanter et al. |
| 2014/0160153 A1* | 6/2014 | Singh | G06Q 10/101 |
| | | | 345/629 |
| 2014/0172799 A1 | 6/2014 | Dorman |
| 2014/0201289 A1 | 7/2014 | Wheeler et al. |
| 2014/0215302 A1 | 7/2014 | Little et al. |
| 2014/0223333 A1 | 8/2014 | Pegg et al. |
| 2014/0237387 A1 | 8/2014 | Ryall et al. |
| 2014/0244580 A1 | 8/2014 | Eisner |
| 2014/0244583 A1 | 8/2014 | Wang et al. |
| 2014/0250064 A1 | 9/2014 | Hopmann et al. |
| 2014/0279846 A1 | 9/2014 | Srinivasan et al. |
| 2014/0280377 A1 | 9/2014 | Frew |
| 2014/0280603 A1 | 9/2014 | Rideout et al. |
| 2014/0330776 A1 | 11/2014 | Chen |
| 2014/0372852 A1 | 12/2014 | Rothschiller et al. |
| 2015/0012488 A1 | 1/2015 | Van Rossum |
| 2015/0032686 A1* | 1/2015 | Kuchoor | G06F 3/0481 |
| | | | 707/608 |
| 2015/0077326 A1* | 3/2015 | Kramer | G06F 3/0325 |
| | | | 345/156 |
| 2015/0082196 A1 | 3/2015 | Berger et al. |
| 2015/0106750 A1* | 4/2015 | Konami | G06Q 10/101 |
| | | | 715/759 |
| 2015/0112927 A1 | 4/2015 | Lee et al. |
| 2015/0142742 A1 | 5/2015 | Hong |
| 2015/0149404 A1 | 5/2015 | Lock et al. |
| 2015/0261411 A1 | 9/2015 | Snook et al. |
| 2015/0278330 A1 | 10/2015 | Hawa et al. |
| 2015/0281869 A1 | 10/2015 | Ramachandran et al. |
| 2015/0286655 A1 | 10/2015 | Von Haden et al. |
| 2015/0288757 A1 | 10/2015 | Larabie-Belanger |
| 2015/0288774 A1 | 10/2015 | Larabie-Belanger et al. |
| 2015/0288775 A1 | 10/2015 | Larabie-Belanger |
| 2015/0370769 A1 | 12/2015 | Pereira Filho et al. |
| 2015/0379879 A1 | 12/2015 | Selkirk et al. |
| 2016/0078237 A1 | 3/2016 | Tan |
| 2016/0105859 A1 | 4/2016 | Zhu |
| 2016/0119414 A1 | 4/2016 | Westaway et al. |
| 2016/0259508 A1 | 9/2016 | Eccleston et al. |
| 2016/0308940 A1 | 10/2016 | Procopio et al. |
| 2017/0249328 A1 | 8/2017 | Liang et al. |
| 2018/0113862 A1 | 4/2018 | Glover |

FOREIGN PATENT DOCUMENTS

| | | | |
|---|---|---|---|
| JP | H10187619 A | 7/1998 |
| JP | 2002351730 A | 12/2002 |
| JP | 2003157225 A | 5/2003 |
| JP | 2003178015 A | 6/2003 |
| JP | 2007500407 A | 1/2007 |
| JP | 2008210192 A | 9/2008 |
| JP | 2010517122 A | 5/2010 |
| JP | 2010211569 A | 9/2010 |
| JP | 2010218432 A | 9/2010 |
| JP | 2011526034 A | 9/2011 |
| JP | 2012038210 A | 2/2012 |
| JP | 2012150647 A | 8/2012 |
| JP | 2012519890 A | 8/2012 |
| JP | 2012173780 A | 9/2012 |
| JP | 2012209614 A | 10/2012 |
| JP | 2013161481 A | 8/2013 |
| JP | 2013196233 A | 9/2013 |
| JP | 2014095960 A | 5/2014 |
| JP | 2015505627 A | 2/2015 |
| JP | 2015513713 A | 5/2015 |
| KR | 20110124797 A | 11/2011 |
| KR | 20150069397 A | 6/2015 |
| WO | WO-2005114383 A2 | 12/2005 |
| WO | 2010100354 A1 | 9/2010 |
| WO | WO 2011/109416 | 9/2011 |
| WO | WO-2013109552 A1 | 7/2013 |
| WO | WO-2013109557 A1 | 7/2013 |
| WO | 2014003781 A1 | 1/2014 |
| WO | WO-2014021031 A1 | 2/2014 |
| WO | WO-2015139179 A1 | 9/2015 |

OTHER PUBLICATIONS

"Concurrent Versions System," Wikipedia, Jun. 20, 2013, 9 pages, [Online] [Retrieved on Sep. 23, 2014] Retrieved from the Internet<URL:http://en.wikipedia.org/w/index.php?title=Concurrent_Versions_System&oldid=560712674>.

PCT International Search Report and Written Opinion, PCT Application No. PCT/US2014/045631, dated Oct. 6, 2014, 14 pages.

"Rsync," Wikipedia, Jun. 26, 2013, 8 pages, [Online] [Retrieved in Sep. 23, 2014] Retrieved from the Internet<URL:http://en.wikipedia.org/w/index.php?title=Rsync&oldid=561-668126>.

United States Office Action, U.S. Appl. No. 14/635,192, dated May 4, 2017, 12 pages.

Notice of allowance of Japanese Application No. 2019-080438, dated Jun. 1, 2020, 5 pages.

Notice of allowance of Japanese Application No. 2019-029541, dated Jun. 8, 2020, 5 pages.

Non-Final Office Action from U.S. Appl. No. 16/560,901, dated Aug. 5, 2020, 7 pages.

Notice of Allowance from U.S. Appl. No. 15/867,693, dated Aug. 13, 2020, 2 pages.

Notice of Allowance from U.S. Appl. No. 15/867,693, dated Aug. 21, 2020, 2 pages.

(56) References Cited

OTHER PUBLICATIONS

Adahl J., "Shared Resource for Collaborative Editing Over a Wireless Network," Master of Science Thesis, University of Gothenburg, Dec. 2010, 274 pages.
Advisory Action from U.S. Appl. No. 16/296,104, dated Apr. 14, 2020, 3 pages.
Anonymous, "c#—Is there Windows System Event on Active Window Changed?" Stack Overflow, Nov. 15, 2015, retrieved from https://web.archive.org/web/20151115134250/https://stackoverflow.com/questions/4407631/is-there-windows-system-eventon-active-wi ndow-changed on Mar. 25, 2019, 1 page.
Decision of Refusal for Japanese Application No. 2018-517385 dated Nov. 11, 2019, 7 pages.
European Summons to Attend Oral Proceedings Pursuant to Rule 115(1) EPC for EP Application No. 15736317.7 dated Oct. 24, 2019, 7 pages.
European Summons to Attend Oral Proceedings Pursuant to Rule 115(1) EPC for EP Application No. 16767369.8 dated Nov. 6, 2019, 8 pages.
European Summons to Attend Oral Proceedings Pursuant to Rule 115(1) EPC for EP Application No. 15736316.9 dated Oct. 24, 2019, 7 pages.
Examination Report No. 4, for Australian Application No. 2016381225, dated Nov. 28, 2019, 5 pages.
Examination Report for EP Application No. 15736316.9 dated Oct. 30, 2017, 5 pages.
Examination Report for EP Application No. 15736317.7 dated Oct. 30, 2017, 4 pages.
Examination Report No. 1,for Australian Application No. 2015246019, dated Apr. 11, 2019, 4 pages.
Examination Report No. 2, for Australian Application No. 2015246019, dated Jul. 10, 2019, 3 pages.
Examination Report No. 3, for Australian Application No. 2016381225, dated Sep. 2, 2019, 4 pages.
Examination Report No. 1 for Australian Application No. 2016381225 dated Feb. 28, 2019, 4 pages.
Final Office Action from U.S. Appl. No. 15/867,693, dated Jan. 28, 2020, 17 pages.
Final Office Action from U.S. Appl. No. 16/296,104, dated Feb. 19, 2020, 13 pages.
First Office Action for Australian Application No. 2015246020, dated Apr. 12, 2019, 4 pages.
First Office Action for Japanese Application No. 2018517385 dated Mar. 18, 2019, 5 pages.
First Office Action for Japanese Application No. 2018517385, dated Mar. 18, 2019, 5 pages (with English concise explanation of relevance).
International Search Report and Written Opinion for PCT Application No. PCT/IB2015/052519 dated Jun. 18, 2015, 9 pages.
International Search Report and Written Opinion for PCT Application No. PCT/IB2015/052521 dated Sep. 24, 2015, 8 pages.
International Search Report and Written Opinion for PCT Application No. PCT/IB2015/052522 dated Jun. 18, 2015, 11 pages.
International Search Report and Written Opinion for PCT Application No. PCT/IB2015/052523 dated Sep. 24, 2015, 7 pages.
International Search Report and Written Opinion for PCT Application No. PCT/IB2016/055286 dated Oct. 31, 2016, 12 pages.
Lim H., et al., "Ubi-Jector", CHI 2013: Changing Perspectives, Paris, France, Apr. 27-May 2, 2013, pp. 1695-1700.
Non-Final Office Action from U.S. Appl. No. 14/983,847, dated Oct. 31, 2019, 14 pages.
Non-Final Office Action from U.S. Appl. No. 15/867,693, dated Sep. 17, 2019, 19 pages.
Non-Final Office Action from U.S. Appl. No. 16/115,563, dated Oct. 3, 2019, 8 pages.
Non-Final Office Action from U.S. Appl. No. 16/296,104, dated Jul. 22, 2020, 13 pages.
Non-Final Office Action from U.S. Appl. No. 16/510,018, dated Jul. 23, 2020, 19 pages.
Notice of acceptance for Australian Application No. 2015246018 dated Oct. 21, 2019, 3 pages.
Notice of Acceptance for Australian Application No. 2016381225, dated Feb. 13, 2020, 3 pages.
Notice of Allowance from U.S. Appl. No. 14/983,847, dated Jan. 30, 2020, 10 pages.
Notice of Allowance from U.S. Appl. No. 15/867,693, dated Jul. 28, 2020, 9 pages.
Notice of Allowance from U.S. Appl. No. 16/115,563, dated Dec. 13, 2019, 7 pages.
Notice of Allowance for Japanese Application No. 2018517385, dated Mar. 27, 2020, 5 pages.
Notice of Reasons for Refusal for Japanese Application No. 2018-517385, dated Mar. 18, 2019, 7 pages.
Notice of Reasons for Refusal for Japanese Application No. 2019-036310 dated Mar. 16, 2020, 7 pages.
Notice of Reasons for Refusal of Japanese Application No. 2019-029541, dated Mar. 19, 2020, 4 pages.
Office Action for U.S. Appl. No. 14/248,158, dated Apr. 4, 2018, 16 pages.
Office Action for U.S. Appl. No. 14/248,158, dated Dec. 14, 2017, 19 pages.
Office Action for U.S. Appl. No. 14/248,158, dated Dec. 30, 2016, 12 pages.
Office Action for U.S. Appl. No. 14/248,158, dated Feb. 20, 2018, 4 pages.
Office Action for U.S. Appl. No. 14/248,158, dated Jun. 17, 2016, 15 pages.
Office Action for U.S. Appl. No. 14/248,158, dated Jun. 29, 2017, 17 pages.
Office Action for U.S. Appl. No. 14/248,158, dated Oct. 18, 2018, 15 pages.
Office Action for Australian Application No. 2015246018, dated Apr. 5, 2019, 6 pages.
Office Action for EP Application No. 16767369.8, dated Apr. 1, 2019, 7 pages.
Office Action for EP Application No. 16767369.8, dated Nov. 6, 2019, 8 pages.
Office Action for European Application No. 16767369.8 dated Apr. 1, 2019, 7 pages.
Office Action for Japanese Application No. 2016-553439 dated Oct. 19, 2018, 7 pages.
Office Action for Japanese Application No. 2016-553452 dated Oct. 19, 2018, 11 pages.
Office Action for Japanese Application No. 2016-553454 dated Nov. 16, 2018, 5 pages.
Office Action for U.S. Appl. No. 14/248,155 dated Jan. 23, 2017, 14 pages.
Office Action for U.S. Appl. No. 14/248,155 dated Jun. 12, 2017, 15 pages.
Office Action for U.S. Appl. No. 14/248,155 dated Jun. 7, 2016, 13 pages.
Office Action for U.S. Appl. No. 14/983,094 dated Feb. 8, 2018, 19 pages. .
Office Action for U.S. Appl. No. 14/983,094 dated Sep. 6, 2018, 20 pages. .
Office Action for U.S. Appl. No. 16/195,607 dated Jun. 26, 2019, 6 pages.
Office Action for U.S. Appl. No. 16/296,104 dated Sep. 6, 2019, 13 pages.
Office Action from European Patent Application No. 15719292.3 dated Nov. 28, 2019, 13 pages.
Second Office Action for Australian Application No. 2016381225, dated May 10, 2019, 6 pages.
Second Office Action for Australia Application No. 2016381225, dated May 10, 2019, 6 pages.
Stack Overflow, " Is there Windows system event on active window changed?" Nov. 15, 2015, retrieved from https://web.archive.org/web/20151115134250/https://stackoverflow.com/questions/4407631/is-there-windows-system-event-on-active-window-changed on Mar. 25, 2019, 1 page.

(56) References Cited

OTHER PUBLICATIONS

Terry D.B., et al., "Managing Update Conflicts in Bayou, a Weakly Connected Replicated Storage System," Proceedings of the 15th ACM Symposium on Operating System Principles, Dec. 3-6, 1995, pp. 172-183.
Anonymous: "Event (computing)—Wikipedia," XP055728697, Apr. 3, 2014, retrieved from the Internet:URL:https://en.wikipedia.org/w/index.php?title=Event_(computing)&oldid=602539019 on Sep. 9, 2020, 5 pages.
Bishop J., et al., "Developing Principles of GUI Programming using Views," Computer Science Education, ACM, Mar. 1, 2004, pp. 373-377.
Brief Communication of Oral Proceedings on Sep. 28, 2020 for European application No. 15736316.9 dated Sep. 16, 2020, 4 pages.
Bruce K.B., et al., "Event-Driven Programming Facilitates Learning Standard Programming Concepts," Object-Oriented Programming Systems, Languages and Applications, ACM, Oct. 23, 2004, pp. 96-100.
Examination Report No. 1, for Australian Application No. 2019284033, dated Dec. 17, 2020, 5 pages.
Ganov S., et al., "Event Listener Analysis and Symbolic Execution for Testing GUI Applications," Formal Methods and Software Engineering, Dec. 9, 2009, pp. 69-87.
Non-Final Office Action from U.S. Appl. No. 16/784,747, dated Oct. 15, 2020, 19 pages.
Notice of Allowance for Japanese Application No. 2019-036310 dated Oct. 16, 2020, 5 pages.
Final Office Action from U.S. Appl. No. 16/296,104, dated Oct. 1, 2020, 12 pages.
Notice of Allowance from U.S. Appl. No. 16/560,901, dated Sep. 14, 2020, 8 pages.
Notice of Allowance from U.S. Appl. No. 16/560,901, dated Sep. 24, 2020, 5 pages.
Notice of Allowance for Japanese Application No. 2019-124719, dated Oct. 5, 2020, 5 pages.
Examination Report No. 2 for Australian Application No. 2019257465 dated Dec. 18, 2020, 4 pages.
Notice of Allowance from U.S. Appl. No. 16/784,747, dated Feb. 9, 2021, 8 pages.
"Document Object Model Events," retrieved from https://web.archive.org/web/20120218163544/http://www.w3.org/TR/DOM-Level-2-Events/events.html, Feb. 18, 2012, 23 pages.
Examination Report No. 1, for Australian Application No. 2019264563, dated Nov. 10, 2020, 6 pages.
Examination Report No. 3 for Australian Application No. 20190257465 dated Oct. 22, 2020, 5 pages.
Final Office Action from U.S. Appl. No. 16/510,018, dated Oct. 27, 2020, 15 pages.
"Listeners Supported by Swing Components," retrieved from https://web.archive.org/web/20131010082743/http://docs.oracle.com/javase/tutorial/uiswing/events/eventsandcomponents.html, Oct. 10, 2013, 3 pages.
Notice of Allowance from U.S. Appl. No. 16/560,901, dated Nov. 27, 2020, 3 pages.
Examination Report No. 2, for Australian Application No. 2019264563, dated Feb. 22, 2021, 4 pages.
Examination Report No. 2, for Australian Application No. 2019284033, dated Feb. 10, 2021, 6 pages.
Non-Final Office Action from U.S. Appl. No. 16/510,018, dated Mar. 19, 2021, 14 pages.
Notice of Acceptance for Australian Application No. 2019284033 dated May 20, 2021, 3 pages.
Examination Report No. 3 for Australian Application No. 2019257465, dated Mar. 23, 2021, 6 pages.
Non-Final Office Action from U.S. Appl. No. 16/280,845, dated Jun. 24, 2021, 22 pages.

* cited by examiner

Fig. 10

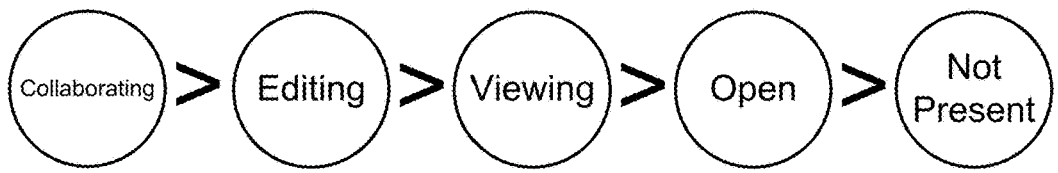

Fig. 11

Content Item
27cd0162a6144bf

| Device ID | UserID | User Interface Element ID | Process ID | Presence Information |
|---|---|---|---|---|
| 58bre98 | Carl | 12 | 34 | Open |
| 58bre98 | Carl | 6 | 45 | Edit |
| 23mjj45 | Carl | 3 | 76 | View |
| 58bre98 | Carl | 4 | 98 | Collaborate (P) |
| 47a02b4 | Jim | 2 | 87 | View |
| 2581a26 | Jim | 7 | 128 | Open |
| 36abe87 | John | 15 | 23 | Edit |
| 36abe87 | John | 10 | 23 | Open |
| 9d7523c | John | 1 | 7 | View |
| 68792aa | Sue | 92 | 334 | Open |
| 36abe87 | Beth | 78 | 56 | Collaborate (S) |
| 8c983dc | Beth | 87 | 6 | Edit |
| 98452dd | Beth | 90 | 1078 | View |
| 8c983dc | Beth | 8 | 43 | Open |
| 47a02b4 | Amanda | | | Notify (John ends editing) |

| UserID | Presence |
|---|---|
| Jim | View |
| John | Edit |
| Sue | Open |
| Carl | Collaborate (P) |
| Beth | Collaborate (S) |

Fig. 14

NATIVE APPLICATION COLLABORATION

CROSS REFERENCE TO RELATED APPLICATIONS

This application is a continuation of U.S. application Ser. No. 15/810,006, filed Nov. 11, 2017, now U.S. Pat. No. 10,235,022, which application is a continuation of U.S. application Ser. No. 14/635,192, filed Mar. 2, 2015, now U.S. Pat. No. 9,846,528, all of which is incorporated by reference in its entirety.

BACKGROUND

This disclosure relates generally to sharing information among devices, and particularly to sharing display and editing control of a document in a native application.

Content management systems permit devices to synchronize content items with the content management system and other devices. A device stores a local copy of content items. When content items are added, deleted, and edited on a device, these modifications are sent to the content management system for storage and synchronization with other devices. To interact with a content item, users typically execute a native application on the device to view and modify the content item. Modifications to a content item may be synchronized with the content management system separately from the execution of the native application. Accordingly, multiple devices may separately view and edit a particular content item. When users each modify the same content item, versioning problems may arise from conflicting edits. In part, these conflicts arise because users are not aware that other users are modifying the contact item in parallel. In some content management system implementations, users of devices sharing content items can be made aware of each other's interactions with shared items on their respective devices. However, a user still cannot see the changes made by other users until a content item is reloaded. This leads to inneficiencies when multiple users want to edit a content item at the same time.

SUMMARY

Described embodiments enable a set of users of devices sharing content items via a content management system to simultaneously view and modify a single instance of the same content item within a native application. In various embodiments, graphical and textual information is provided to users on their respective devices indicating that a shared content item is being viewed or edited on one or more other devices. In addition, in various embodiments users can collaboratively edit the shared content item from two or more devices.

A device in accordance with various embodiments stores a local copy of a shared content item, which is maintained and synchronized between devices by a content management system. The device includes a native application that can be used to access the content item, such as a word processor, media viewer, media editor, and so forth. The native application displays information relating to the content item in a user interface element, such as a window. The device also includes a client application that monitors interactions with the content item and communicates information about those interactions to other devices sharing the content item either directly or via the content management system. The client application generates interaction information including data describing the user's interactions with a content item. The client application also facilitates collaboration between two or more devices.

Interaction information includes interactions with the client application and interactions with the native application. Interaction information may be determined from presence information, which include programmatic events that occur in the native application. Presence events include opening a content item, editing a content item, saving a content item, renaming a content item, moving a content item, and deleting a content item. Presence events also include interactions with the user interface element of the native application, such as the user interface element gaining or losing focus. A focused user interface element is the user interface element that receives user inputs at the device. For example, if a user interface element has focus, presence information may be generated indicating that a user is "viewing" the content item via that user interface element. In one embodiment, the presence events are gathered by the client application, which is separate from the native application interacting with the content item. That is, in this embodiment the presence events are gathered by another application or process that is not integrated into the native application accessing the content item or the presence information.

Additional types of interaction information include notes, messages, notification requests, and collaboration requests related to the content item, which may be received by the client application. Messages may include chat messages to other devices and messages indicating a user's intent to interact with (e.g., to edit) a content item. Collaboration requests may include requests by a user to collaborate with one or more other users on a content item, and requests to share control of one or more user input devices during a collaboration session. Interaction information also includes metadata modifications, such as versioning notes, or requests for further information stored at the content management system about the content item, such as a request to view versioning information or prior content item versions. The interaction information is exchanged by the devices to provide users with information regarding others' interactions with the content item.

The client application monitors events on the device to determine when a user is using a native application to interact with a synchronized content item. In one method of monitoring events, the client application registers with a process controlling a user interface element or the operating system to receive events related to the user interface element. The client application may monitor all such events, or only certain user interface elements associated with opening a synchronized content item. When a presence event occurs, the client application receives the presence event from the native application or from an operating system. The client application identifies a user interface element associated with the event and determines presence information associated with the event. The client application notifies the content management system that the content item is being or has been interacted with, and sends the presence information to the content management system. The presence information (or other interaction information) may be sent directly to other devices.

The content management system receives the interaction information and may respond to the interaction information or send the interaction information to other devices based on the type of interaction information. Interaction information relating to messages is sent to other devices synchronized to the content item. Presence information is stored as a presence record, which in one embodiment indicates a content item, device, process, user interface element, and a type of presence (e.g., that the content item is open, viewed, being edited, or being collaboratively edited). A user presence may be determined that indicates a priority of interaction according to an ordering of interactions. In an example ordering, editing a content item has a higher priority than viewing the content item, which has a higher priority than opening the content item. The user presence describes a user's presence with respect to a content item and may be without reference to any particular device, process, or user interface element. The content management system may send the information to all devices that are synchronized with respect to the content item, or just to devices that are associated with an active presence record with respect to the content item. In one embodiment, devices register with the content management system to receive interaction information about a content item, which may specify a particular interaction to trigger notification. When the interaction occurs, the triggering interaction information is sent to devices associated with the notification.

In one embodiment, when modifications to a content item are received at the content management system, devices are instructed to perform actions depending on the interaction information associated with the client device. For example, a device associated with a presence record is notified that the content item is modified, and the content management system instructs the device to display a prompt for the user to select whether to discard the content item edits or create a new version of the content item.

When presence information for other client devices is received that relates to a content item opened by a native application, the client application displays the presence information in a presence indicator near the user interface element of the native application. The presence indicator may be an image of a user associated with the received presence information, and may indicate the particular type of the presence information, and the number of users exhibiting that type of presence. To display the presence indicator, the client device determines the boundaries of the user interface element of the native application and displays the presence indicator at the boundary of the user interface element or in another suitable location to not obscure the user interface element. For example, the presence indicator may be a thumbnail image of the user modifying a shared content item, displayed alongside a border of the window containing the content item. The presence indicator may also be displayed on a toolbar or other portion of a display. In addition to the presence information, other types of interaction information may also be presented. For example, chat messages, a requested notification about a user's presence, versioning information, collaboration information, and other interaction information may be displayed.

The presence indicator may further contain controls for collaboration. For example, the presence indicator may include a user interface element to initiate a collaboration session between two or more users. Collaboration may occur in association with a content item that is synchronized with two or more devices via the content management system. A primary device is chosen for collaboration. The primary device includes an instance of the content item that will be collaboratively edited by the collaborating users during a collaboration session. Devices involved in the collaboration session other than the primary device are secondary devices. During collaboration, each collaborating device displays a window having a view of the content item instance on the primary device. In various embodiments, users of secondary devices are able to provide input to edit the content item on the primary device. At the conclusion of a collaboration session, the content item is saved by the primary device and sent to the secondary devices. This may occur either directly or through the content management system.

When a new version of a content item is synchronized to the content management system, the interface may also display information informing the user that the local copy is out of sync with the version on the content management system, and either suggesting or forcing a refresh of the user's local copy. In some embodiments the user may be offered an opportunity to save the out-of-sync version of the file as well, for example using an alternative file name, prior to the file being refreshed to the current version.

Devices display presence information relating to other users' interactions with a content item in conjunction with a user interface for the application displaying the content item itself. This permits users to view, in essentially real or near real-time, the activity of other users with respect to a content item. In addition, the presence information is collected in one embodiment without relying on modifications or add-ons to the native application displaying or modifying the content item. In addition, presenting interfaces to communicate with the content management system alongside the application user interface permits users to conveniently exchange chat information and retrieve data about a content item while the content item is being displayed.

In various embodiments, the client application additionally displays presence information in a content item browser ("browser") for viewing a folder or other collection of content items. The collection of content items may include content items that may be interacted with by a native application, and may include collections within the collection. Thus, each collection may itself be a collection of content items, such that the collection of content items may be hierarchically arranged (e.g., a folder within a folder). Interaction information for a particular content item is associated with each collection of content items that contain the content item.

For clarity of description, when the browser displays a collection that includes a collection (i.e., the folder within a folder), the included collection is termed an organizational element. That is, when the browser displays a collection, the displayed content items that are collections are termed organizational elements.

When a user views a collection of content items in the browser, the browser displays a status indicator reflecting interaction information related to the content items. Each organizational element displayed in the browser also displays an indicator reflecting interaction information of content items, such as further organizational elements, within that organizational elements. For example, a browser may display a collection of two content items and one organizational element (e.g. a folder containing three content items). A status indicator is displayed with each of the two content items to indicate interaction information relating to the content items, and a status indicator is displayed with the organizational element indicating interactions with its content items (e.g., the three content items within the folder). To obtain further information, a user may select or place a cursor over a content item or organizational element. Alternatively, the user may control the browser to display the collection of content items described by an organizational element. To generate the display of the browser, the client application filters the interaction information to display interaction information relevant to the organization of content items being displayed to the user. This permits a user to view, within a content item browser, interaction information for the content items associated with the organization of content items, and to view, at a glance, interactions of other users with respect to various organizational elements and content items.

Interaction information and other metadata relating to the collection may also be displayed to the viewing user in an activity feed. The interaction information and other metadata may be associated with a shared folder that is synchronized with the client and includes the displayed collection. The activity feed displays interaction information and other information associated with the collection of content items presently displayed in the browser. The activity feed may display currently active users (e.g., those with active presence information, such as "viewing"), along with actions performed by those users and notifications related to the collection of content items. These actions and notifications may include changes in presence information, or other notifications relating to interaction information, such as the interaction information described above. In particular, this may include interaction information entered by a user using an interface element displayed with a native application, such as a chat message or a request to be notified. In addition to the interaction information, the activity feed may also display information reflecting changes to content items, the collection, or (if applicable) the shared folder. For example, the changes to the shared folder may be a new user added to the shared folder or a change to a content item may be a new version of a content item becoming available. The user may also interact with the browser to filter for particular users (e.g., to identify a content item, including an organization element, where a user is associated with presence information), to identify when a user last interacted with a content item, or to add interaction information (e.g., a chat message) relating to the organizing element itself.

BRIEF DESCRIPTION OF THE DRAWINGS

FIG. 10 shows an ordering of user presence according to one embodiment.

FIG. 11 shows a presence record in a presence table relating to a content item according to one embodiment.

FIG. 14 shows a folder-level display of interaction information according to one embodiment.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Figure 1:
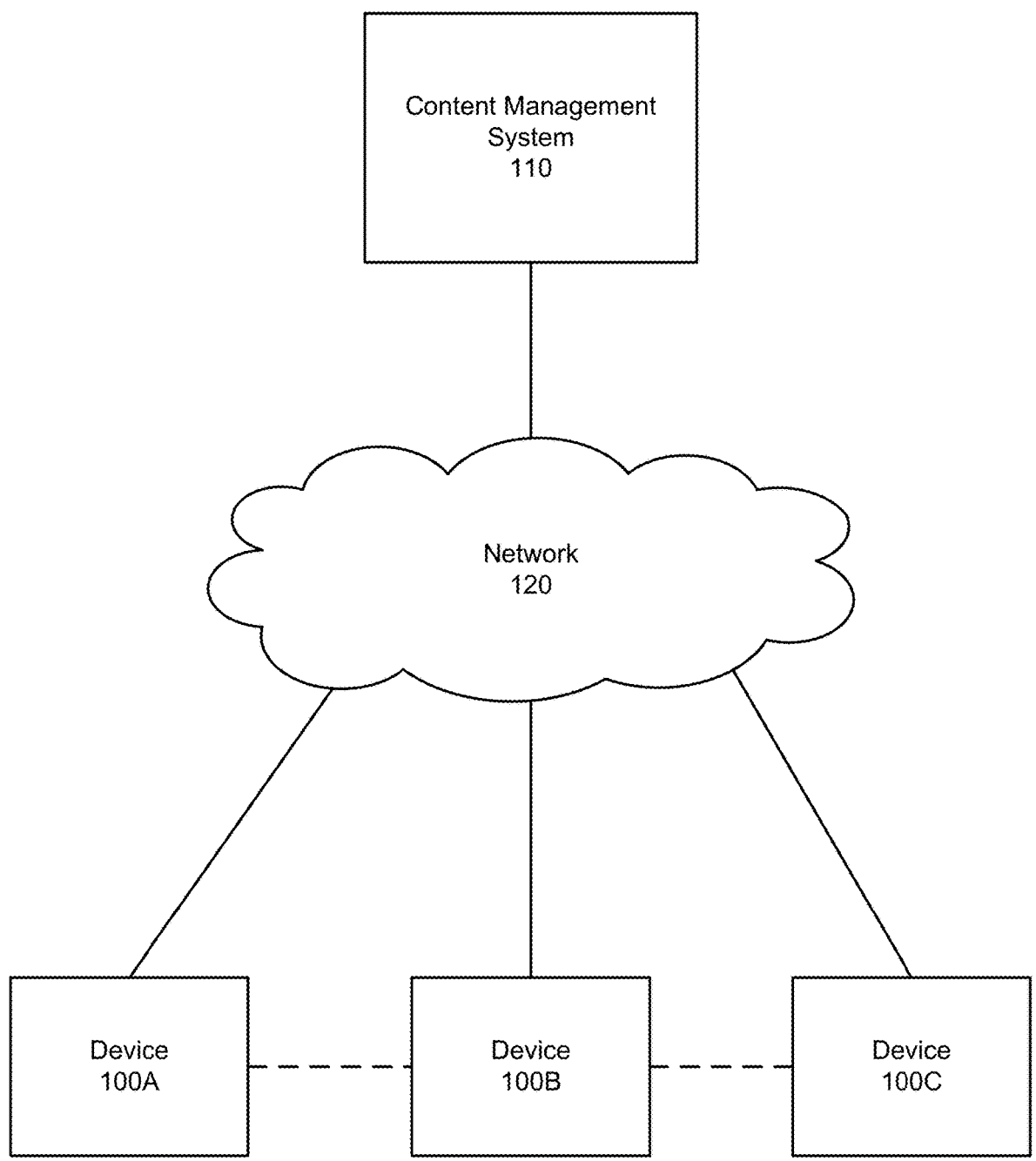
FIG. 1 shows an embodiment of an environment for content item synchronization including communication of interaction information and user collaboration

FIG. 1 shows an embodiment of an environment for content item synchronization including communication of interaction information and user collaboration. FIG. 1 includes devices 100A, 100B, 100C (referred to generally as device 100), content management system 110, and network 120. Three devices are shown only for purpose of illustration; in practice any number of devices may be present in the environment. Similarly, other modules or components described and illustrated throughout may include single or multiple instances as appropriate to the needs of the implementer and without loss of generality.

Device 100 may be any suitable computing device for locally storing and viewing content items and synchronizing the content items with content management system 110. Examples of devices include desktop and laptop computers, hand-held mobile devices, tablet computers, and other computing devices. The operation of device 100 in various embodiments is further described below.

Each device 100 communicates with content management system 110 through network 120. Network 120 is any suitable network and may include local networks, corporate networks, global networks, and any combination of these. In typical configurations, devices 100 communicate via a wired or wireless communication network to a local network service provider, and communicate with content management system 110 through the Internet. In certain configurations, devices 100A, 100B, and 100C communicate directly with one another without network 120 as indicated in FIG. 1 by dashed lines. For example, devices 100 may communicate via a wired or wireless connection, such as wirelessly via a Bluetooth connection or a wired connection via a Universal Serial Bus (USB).

Content management system 110 provides content sharing and synchronization services for users of devices 100. These services allow users to share content with users of other devices 100. In addition to content sharing, content management system 110 updates shared content responsive to changes and enables synchronized changes to content items across multiple devices 100. A user may synchronize content across multiple devices 100 owned by the user and associated with the user's account, and the user may share content that is synchronized with devices associated with other users' accounts. Content stored by content management system 110 can include any type of data, such as digital data, documents, media (e.g., images, photos, videos, audio, streaming content), data files and databases, source and object code, recordings, and any other type of data or file, collectively referred to here as "content items." Content items stored by content management system 110 may also be used to organize other content items, such as folders, tables, collections, albums, playlists, or in other database structures (e.g., object oriented, key/value etc.). In practice, various devices 100 may be synchronizing different groups of content items, based on user associations, permissions, content sharing permissions, and so forth. The operation of content management system 110 in various embodiments is further described below.

Figure 2:
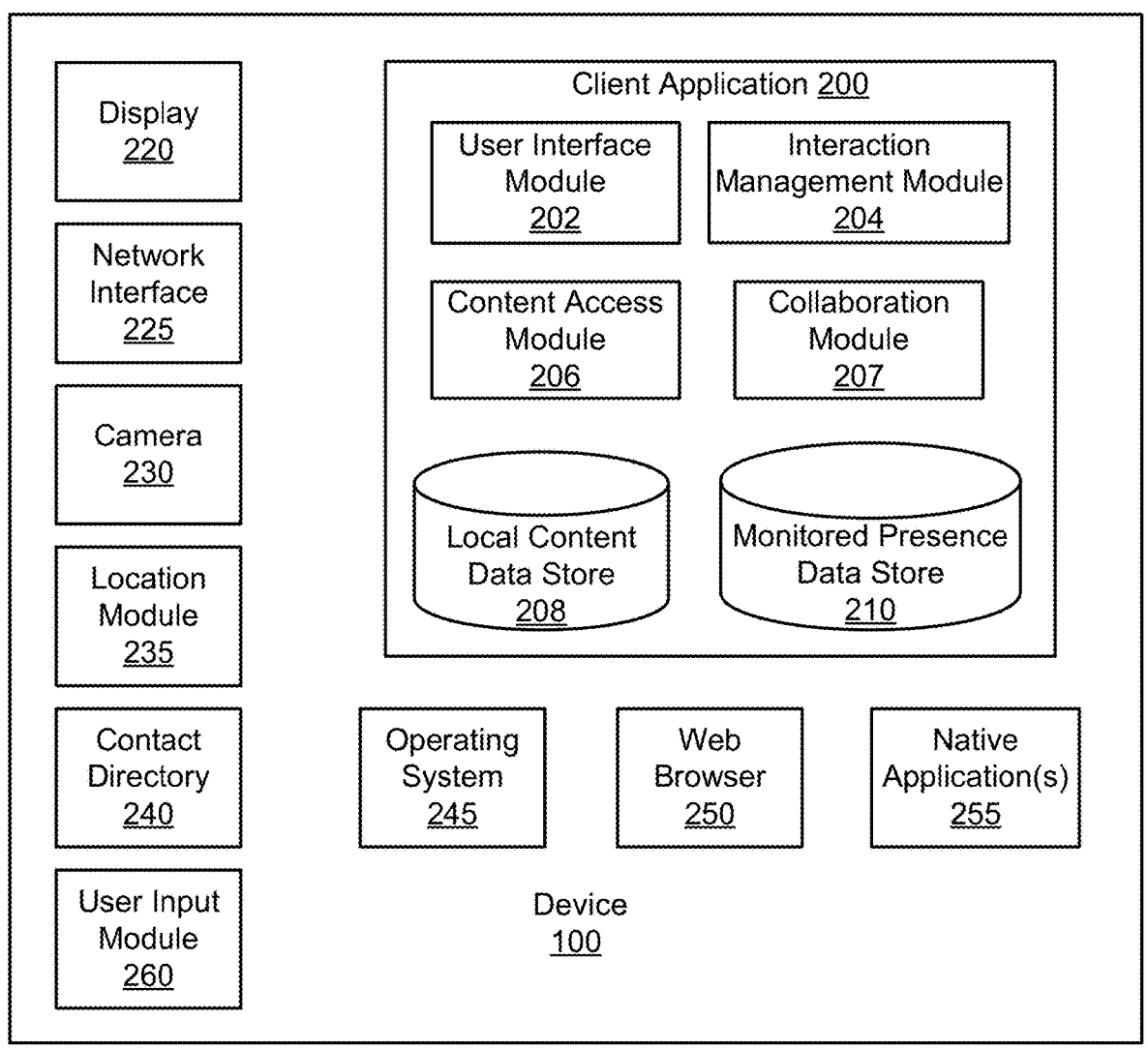
FIG. 2 shows various modules and components of a device in accordance with one embodiment.

FIG. 2 shows various modules and components of device 100 in accordance with one embodiment. Device 100 includes display 220 for providing information to the user, and in certain client devices 100 includes a touchscreen. Device 100 also includes network interface 225 for communicating with content management system 110 via network 120. Device 100 also includes a user input module 260, which receives user inputs from various user input devices, such as a keyboard, a mouse, a trackpad, or other device. Other conventional components of a client device 100 that are not material are not shown, for example one or more computer processors, local fixed memory (RAM and ROM), as well as optionally removable memory (e.g., SD-card), power sources, and audio-video outputs.

Software modules include operating system 245 and one or more native applications 255. Native applications 255 vary based on the client device, and may include various applications for creating, viewing, consuming, and modifying content stored on content management system 110, such as word processors, spreadsheets, database management systems, code editors, image and video editors, e-book readers, audio and video players, and the like. Operating system 245 on each device provides a local file management system and executes the various software modules such as content management system client application 200 and native application 255. A contact directory 240 stores information about the user's contacts, such as name, picture, telephone numbers, company, email addresses, physical address, website URLs, and the like. Further operation of native applications 255, operating system 245, and content management system client application 200 are described below.

In certain embodiments, device 100 includes additional components such as camera 230 and location module 235. Camera 230 may be used to capture images or video for upload to the online content management system 110. Location module 235 determines the location of device 100, using for example a global positioning satellite signal, cellular tower triangulation, or other methods. Location module 235 may be used by client application 200 to obtain location data and add the location data to metadata about a content item, such as an image captured by camera 230.

Client device 100 accesses content management system 110 in a variety of ways. Client application 200 can be a dedicated application or module that provides access to the services of content management system 110, providing both user access to shared files through a user interface, as well as programmatic access for other applications. Client device 100 may also access content management system 110 through web browser 250. As an alternative, client application 200 may integrate access to content management system 110 with the local file management system provided by operating system 245. When access to content management system 110 is integrated in the local file management system, a file organization scheme maintained at content management system 110 is represented as a local file structure by operating system 245 in conjunction with client application 200. Client application 200 may take various forms, such as a stand-alone application, an application plug-in, or a browser extension. Client application 200 includes user interface module 202, interaction management module 204, content access module 206, local content data store 208, monitored presence data store 210, and collaboration module 207.

In addition to handling other device tasks, operating system 245 displays information from applications executing on device 100 to a user via display 220, which may include one or more user interface elements. Such user interface elements may vary based on the particular device and configuration. User interface elements include windows on a desktop interface as well as interface elements on a mobile device. Examples of operating systems that employ user interface elements such as windows are Microsoft Windows 8 by Microsoft Corporation of Redmond, Wash., and OS X by Apple Inc. of Cupertino, Calif. In addition, operating system 245 manages control of multiple native applications 255, which may be executing simultaneously. The user interface elements may be layered, such that one layer overlaps another layer. In some operating systems and configurations, only a single user interface element is displayed at a given time. One user interface element is typically the active user interface element, meaning that it is the user interface element to which the operating system 245 routes user inputs, such as keyboard entry, cursor movement, touch sensors, touch gestures, and so forth. As understood by those of skill in the art, a window or other user interface element that is active at a particular time is often said to have focus. Users may select another user interface element to change the focus from one user interface element to another, and in some instances operating system 245 may change the focus without user input.

Typically, the user interface elements, e.g., windows, associated with native applications 255 are managed by operating system 245, which maintains an association between process identifiers of executing native applications 255 and user interface element identifiers of the user interface elements. For example, a particular application may be associated with process id "2587", which may be managing multiple user interface elements, with user interface element identifiers 4, 8, and 10. Each user interface element identifier may be separately associated with a particular content item opened by that native application 255, and multiple user interface element identifiers and process identifiers may be associated with the same content item.

Operating system 245 also handles and recognizes various events. Such events include a request from native applications 255 to close or open a content item, a request from native applications 255 to close a window or other user interface element, and requests to change a user interface element focus, among many others. As described below, these events may be used by interaction management module 204 to recognize a change in presence related to a content item.

Client application 200 identifies interactions that take place with respect to a content item, such as when a user opens, closes or edits the content item on the device. These interactions are identified by client application 200 to generate interaction information describing the interaction with the content item. Interaction information includes interactions with client application 200 and interactions with native application 255. Interaction information determined from actions of native application 255 is termed presence information. An application, such as client application 200 that determines interaction information and presence information is termed a presence application. Additional types of interaction information (in addition to presence information) include notes, messages, and notification requests related to the content item, which may be received by client application 200. Messages may include chat messages to other devices, messages indicating a user's intent to interact with (e.g., to edit) a content item, and messages indicating a user's intent to begin a collaboration session. Notification requests may include a request to be notified when another user's interaction information changes. Interaction information also includes metadata modifications, such as versioning notes, or requests for further information stored at content management system 110 about the content item, such as a request to view versioning information or prior content item versions. Further examples of interaction information is described below.

This interaction information is transmitted to other devices 100 that are synchronized with respect to the content item. The indication of intent may for example alert a second user of the content item on another device that the first user would like to edit the content item, or initiatite a collaborative editing session. Client application 200 identifies when users are using a native application 255 to interact with a content item, and also receives chat or intent information from a user. In various embodiments, device 100 identifies a user's presence in a content item (i.e. that the user has the content item open or is editing the content item) through interaction with operating system 245 as described further below.

Device 100 receives content items from content management system 110 and permits users to view, modify, and interact with the content items using various native applications 255 stored on the device 100. For example, device 100 may include a photo editing application that manipulates image content items, a word processing application that permits modification of text content items, or a computer-aided design (CAD) application that permits modification of drawing content items. As described further below, interaction information is determined by device 100 via user interactions applications and the interaction information is sent to other devices 100. In addition, when device 100 receives interaction information relating to other devices 100, the device 100 displays that interaction information.

In one embodiment, an application detecting interaction information relating to content items is distinct from the applications viewing or manipulating the content items. For example, the client application detecting interaction information is distinct from a photo editing application manipulating or displaying the image content items. In various embodiments, the application detecting interaction information is also responsible for synchronizing the content items with content management system 110. Since the application detecting presence information may be distinct from the applications about which presence is detected, presence may be monitored for many applications and content items at once and without requiring integration of the presence monitoring into each type of content item viewer. That is, no special presence monitoring add-on or application modification is required, for example, for each of a photo editing application, a word processing application, and a playlist editing application.

In one embodiment, devices that are synchronized with respect to a content item may collaboratively edit the content item. Collaborating users may simultaneously view a content item that is open for viewing or editing in native applications. In an alternative embodiment, two or more collaborating users may additionally be able to edit a content item during collaboration. A collaborating user is able to make changes to a content item that are visible to other collaborating users and view changes made to the content item by other collaborating users, all in real time. In some embodiments, user collaboration is managed by collaboration module 207. In other embodiments, collaboration is managed by content management system 110.

Figure 3A:
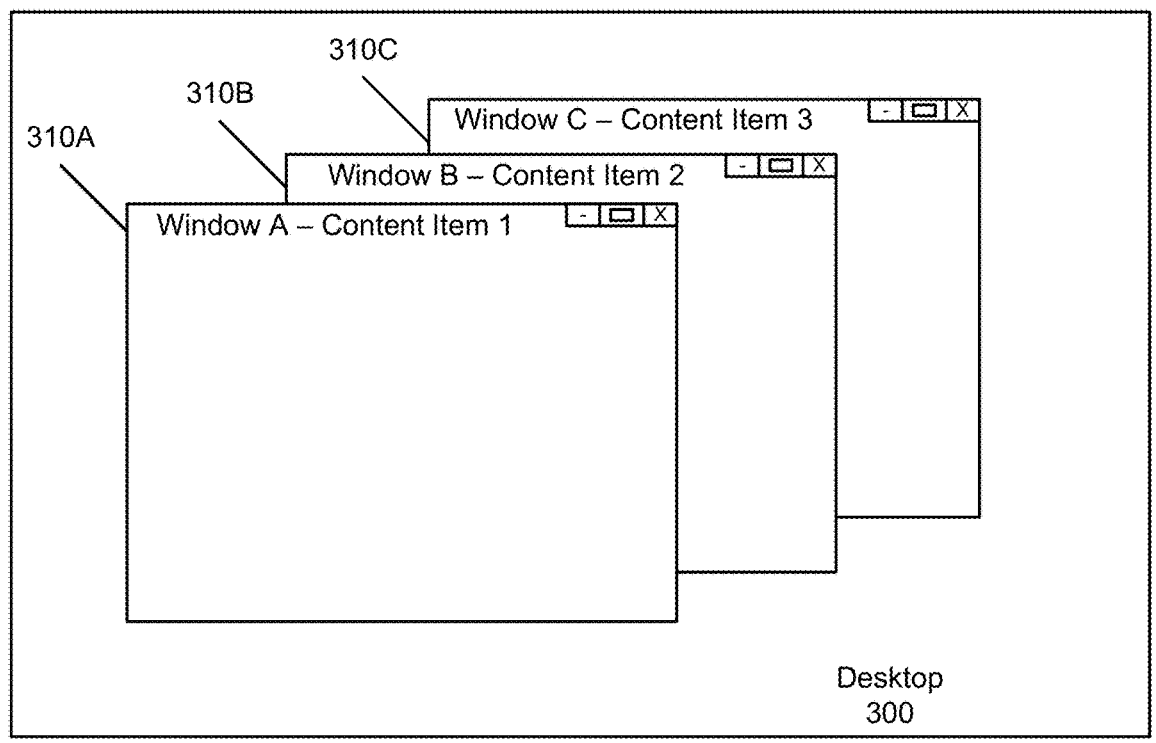
FIGS. 3A and 3B show a user interface element focus change on a desktop display of a device.
Figure 3B:
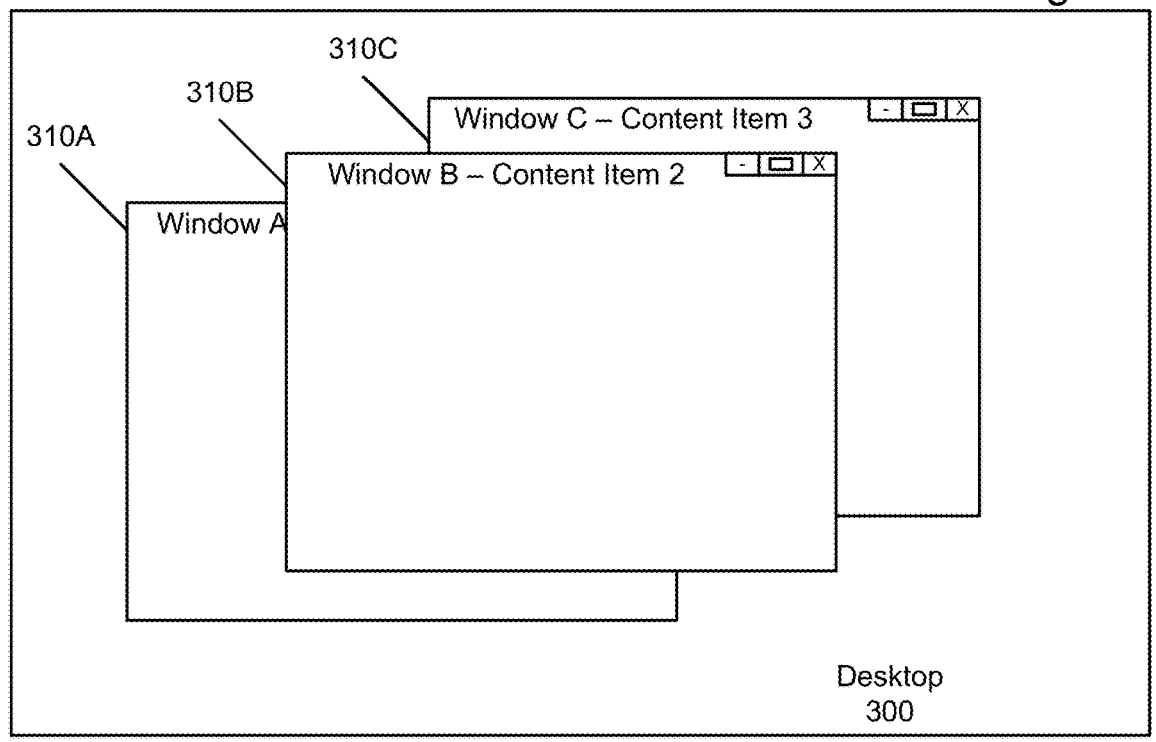

FIGS. 3A and 3B show an example of a user interface element focus change on desktop 300 shown on display 220 of device 100. In FIG. 3A, windows 310A, 310B, and 310C are displayed on desktop 300 and viewable by the user. In this embodiment, desktop 300 is a general container or frame maintained by operating system 245 that encloses user interface elements on display 220. In FIGS. 3A and 3B, the user interface elements are windows 310 in a desktop computing environment. In other configurations, such as a mobile device, or other display with limited area, only a single user interface element might be displayed at a time. As shown by FIG. 3A, window 310A is the active window, shown as the front window, partially obscuring windows 310B and 310C. In FIG. 3B, focus changed to window 310B, which is now the front window and the active window. The focus may change due to user interaction with window 310B, or due to a process requesting that its window become the active window. In certain operating systems and configurations, a user interface element has focus (e.g., is receiving user input) without being the front user interface element.

Referring again to FIG. 2, to open a content item, native application 255 requests the content item from operating system 245 and receives a handle to the content item from operating system 245 for the content item. In some cases, application 245 does not maintain the handle, and may load the content item data into memory and subsequently close the content item handle even if native application 255 continues to use data from the content item or if the user enters edits to the content item. Accordingly, open content item handles are often not a reliable way to determine whether an application is interacting with a particular content item. As such, in certain embodiments, further behaviors exhibited by the native applications 255 are used to determine whether an application is editing a content item.

Native applications 255 also perform various behaviors when a user modifies a content item, and prior to the user saving the content item. These behaviors vary based on the application and operating system 245. For example, some native applications 255 create a temporary content item with a filename that differs from the open content item, for example leading the temporary content item's filename with a tilde or other recognizable mark. In other examples, the native applications 255 changes the title of a user interface element associated with the content item, which may or may not be directly viewable by a user. In still further examples, native application 255 sets a flag indicating the content item has been modified. Native application 255 may also provide information regarding content item modification in response to a request from another application or the operating system. For example the Accessibility API in the OS X operating system as described above provides information regarding content items associated with a user interface element. Since an open content item handle may not reliably determine whether a content item is being edited by a native application 255, these behaviors are used by presence management module 204 to determine presence relating to editing or modifying a content item as described further below.

Native applications 255 may typically be executed on device 100 independently from one another, and may permit communication between the applications and other applications or processes executing on device 100. Native applications 255 typically provide information to processes using application programming interfaces (APIs), which permit applications to request information from the executing process. For example, native applications 255 may present an API permitting a request for user interface elements controlled by the application, or to indicate the title of a user interface element, or to request a path in a file system associated with a content item opened by the native application 255. Similarly, operating system 245 may provide similar APIs to requesting processes, such as requesting information about a process that controls a particular user interface element.

Client application 200 manages access to content management system 110. Client application 200 includes user interface module 202 that generates an interface to the content accessed by client application 200, as variously illustrated herein, and is one means for performing this function. The generated interface is provided to the user by display 220. Client application 200 may store content accessed from a content storage at content management system 110 in local content data store 208. While represented here as within client application 200, local content data store 208 may be stored with other data for client device 100 in non-volatile storage. When local content data store 208 is stored this way, the content is available to the user and other applications or modules, such as native application 255, when client application 200 is not in communication with content management system 110. Content access module 206 manages updates to local content data store 208 and uses synchronization logic to communicate with content management system 110 to synchronize content modified by client device 100 with content maintained on content management system 110. One example of such synchronization is provided in U.S. patent application Ser. No. 14/040,584, filed Sep. 27, 2013 and is hereby incorporated by reference in its entirety. Client application 200 may take various forms, such as a stand-alone application, an application plug-in, or a browser extension.

Content management system 110 may provide additional data for synchronizing content items, such as information designating that a content item has been deleted, or that the device 100 may be viewing or editing an outdated version of a content item.

Interaction management module 204 obtains and manages interaction information relating to a user's synchronized content items. As described above, the interaction management module 204 is typically a distinct module from the native applications 255 being monitored by interaction management module 204 for presence information and executes as a separate process. Interaction management module 204 sends interaction information determined about a content item synchronized to device 100 to content management system 110. Interaction management module 204 also receives interaction information relating to other users from content management system 110 for display to the user. As described further below, in one embodiment the interaction management module 204 displays presence information relating to other users by attaching a presence indicator to a user interface element associated with a synchronized content item. Further interaction information is also displayed with the presence indicator.

To determine many types of interaction information, interaction management module 204 receives interaction information through user interface elements, as further described below. To determine presence information related to a synchronized content item, interaction management module 204 monitors user interface elements associated with native applications 255. Interaction management module 204 can monitor all user interface elements, or alternatively monitor just certain user interface elements after the user interface element is associated with a content item. Monitored presence data store 210 includes information maintained by interaction management module 204 to indicate that particular user interface elements are monitored to determine actions relating to a synchronized content item.

While shown here as a part of client application 200, in various implementations the content access module 206 and interaction management module 204 are separated into distinct modules for performing their respective functions. Similarly, various modules and data stores are described separately throughout this disclosure for convenience and in various implementations may be combined or further separated into separate components as desired.

Figure 4:
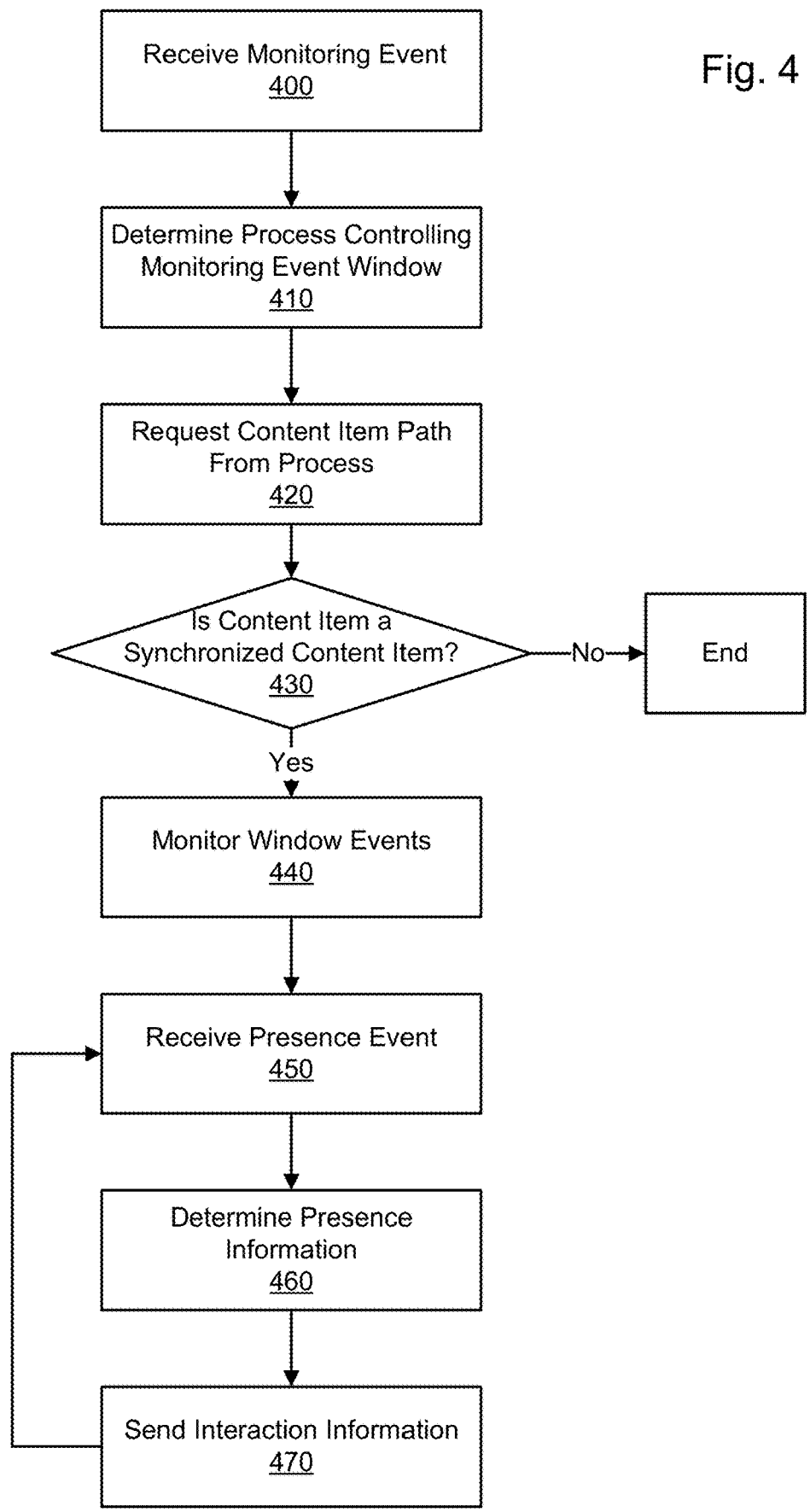
FIG. 4 shows an example process for determining presence information associated with a content item according to one embodiment.

FIG. 4 shows an example process for determining presence information associated with a content item according to one embodiment. This process is typically performed by interaction management module 204. Where the user interface elements are monitored only after being associated with a content item, interaction management module 204 uses events indicating that a content item is being opened by an application or user interface element to determine whether to monitor a user interface element. This is one example of an event that may associate a content item with a user interface element to initiate monitoring of the user interface element, termed a monitoring event. In other embodiments, a selection of user interface elements to monitor is determined in another way, or all user interface elements are monitored, in which case the interaction management module 204 may not use monitoring events.

If enabled by operating system 245, the interaction management module 204 may register with operating system 245 to receive monitoring events for specific applications. In these embodiments, operating system 245 notifies interaction management module 204 when a request to open a content item is received by operating system 245. In this embodiment, interaction management module 204 receives a monitoring event 400 that indicates a window or other user interface element is interacting with a content item, which may be a synchronized content item (i.e., the process is interacting with the content item in a particular user interface element). The monitoring event designates at least a user interface element that triggered the monitoring event. In other embodiments, interaction management module 204 monitors events associated with user interface elements from time-to-time (e.g., five minute intervals) and queries whether the user interface elements are associated with any open content items. According to operating system 245 and native application 255 configuration, this query may be directed to operating system 245 or native application 255. When a user interface element is associated with a newly opened content item, that newly opened content item is treated as a monitoring event to determine whether the newly opened content item is a content item synchronized with content management system 110 and that presence information should be determined for the newly opened content item.

When the monitoring event is received, interaction management module 204 determines 410 which process is responsible for the user interface element associated with the monitoring event. Interaction management module 204 typically determines the process by requesting the process ID associated with the user interface element from operating system 245. In some embodiments, the interaction management module 204 identifies a process by requesting an identification of the process from the user interface element itself.

To confirm that the process and user interface element are correctly associated with one another and that the user interface element is still active, interaction management module 204 may also request from the process the identity of the currently active user interface element. The interaction management module 204 confirms that the currently active user interface element received from the process matches the user interface element associated with the monitoring event.

Using the process identifier, interaction management module 204 requests 420 any open content item from the process to obtain an associated directory path for the content item. The interaction management module 204 may designate the user interface element associated with the monitoring event with the request for the open content item's path. The interaction management module 204 requests the open item from the process or operating system using an interface available interface to the process or operating system. As one example, in the OS X operating system, the accessibility API may be used to access information relating to a content item and content item path for a user interface element, as known in the art. Using the content item path provided by the process, the interaction management module 204 determines whether the opened content item path corresponds to any synchronized content items. If so, interaction management module 204 determines that the content item accessed by the process is a content item synchronized to content management system 110 and associates that process and user interface element with the content item. In other embodiments, other methods may be used to determine whether a content item accessed by the process is a synchronized content item.

If the content item is synchronized 430 to content management system 110, interaction management module 204 stores information relating to the content item, process, and user interface element, to monitor 440 the user interface element for events. When the content item associated with the monitoring event is not synchronized, the process ends and the content item is not monitored. This monitoring information is stored in monitored presence data store 210. To monitor and subsequently receive presence events related to the user interface element, interaction management module 204 registers to receive events associated with the user interface element. The registration process by the interaction management module 204 varies according to the configuration of device 100. Typically the interaction management module 204 registers a request to receive presence events from operating system 245 or from the applicable process or user interface element. While the monitoring events determined whether a user interface element or process interacting with a synchronized content item, presence events are events that may indicate a change in state of a user's presence relating to the user interface element or process associated with a content item. Example presence events include a change in focus of a user interface element, closing a user interface element, closing a content item, opening a content item, and so forth based on the types of presence recognized by the interaction management module 204. In various configurations, the presence events used by interaction management module 204 depend on the events operating system 245 and native application 255 make available for receipt by interaction management module 204.

The presence events are used to determine presence information associated with the content item to which the presence event relates. For example, a presence event indicating that a user interface element that is associated with a content item has the focus will indicate that the user is viewing the content item, and hence the presence information for that content item indicates that state. Likewise, a presence event indicating that a user interface element unrelated to a content item has gained focus indicates that the content item associated with a previously focused user interface element has lost focus, and thus indicates that user is no longer be viewing the content item. Thus, presence information provides a level of semantic interpretation of the underlying presence event itself.

In addition to receiving presence events that the interaction management module 204 registered for, presence events may also be initiated by interaction management module 204 to confirm that presence information has not changed for a monitored user interface element. These presence events may be initiated if a threshold amount of time passed since the last presence event for a particular user interface element or process, or at particular intervals, e.g., every five minutes.

In addition to registering for events, interaction management module 204 may receive interaction events in other ways. In one embodiment, users may expressly indicate interaction information through a user interface element. The user interface element can be configured to allow the user to indicate, for example, that a user intends to revise a content item, to indicate that intent to other users who are editing or viewing the content item, for example by selection of a menu item or icon that represents the particular intent. The user interface element can also be configured to allow a user to indicate other intentions of the user, such as a user's intention to no longer view a content item, or to expressly indicate that a user is not or will not be present for a content item. Other users may use such "not present" intention to know that the content item is free for editing. User input interaction events may also include messages or chat features to be disseminated to other users associated with the content item, for example, to transmit a message to other users currently viewing the content item on other devices.

When a presence event is received 450, interaction management module 204 determines whether any presence information has changed since the last presence event related to a monitored user interface element. For user-initiated interaction information, the interaction information may be the information provided by the user, for example the user's selection of a user interface element indicating that the user intends to modify a content item, or a user's chat message. For presence events, the interaction management module 204 queries the monitored process to determine the status of the monitored user interface element. In particular, the interaction management module 204 queries the process to determine if the monitored user interface element is the active user interface element. When the monitored user interface element is the active user interface element, the content item is being viewed by the user.

In some embodiments, in addition to detecting user presence with respect to a content item, interaction management module 204 also determines whether the content item is being or has been modified by the user. This further aspect enables presence information to be reported more granularly, for example with an indication that a user has a presence with respect to the content item as an editor rather than as a viewer. As the particular actions performed by applications when a content item is being modified may vary as described above, detecting one of these actions by interaction management module 204 indicates that the process has edited the content item. For example, according to the type of actions expected by the process when the content item is edited, interaction management module 204 may query the process to determine if the process indicates the content item has been flagged as modified, if the title information of the user interface element has changed, if a temporary file has been saved or cached, or any other data that suggests the content item has been modified. Interaction management module 204 may also query the operating system to determine if a content item has been saved that matches a temporary content item format, for example a content item with a filename similar to the content item, but with a tilde or other specialized variation of the filename. Such modifications indicate that the presence information associated with the content item should reflect that the user is editing the content item.

After determining 460 the presence information, any new presence information for a user interface element may be stored as monitored presence data store 250. This presence information in one embodiment is stored on a user interface element-by-user interface element basis, such that multiple user interface elements by one process may be associated with the same content item, and have presence information individually managed. In one embodiment, presence information may change based on the current presence status. For example, when the presence information for a content item reflects that the content item is being edited, in one embodiment the presence for the content item in a user interface element is not changed when a user changes focus to another user interface element. Instead, the edited status is maintained with respect to that user interface element until a presence event indicates the user interface element is closed. In another embodiment, since editing has the potential to introduce modifications to the content item, in one embodiment the presence information for an edited document is not changed until the interaction management module 204 receives a notification that modifications to the content item are either committed or the modifications are discarded.

A content item with presence information indicating it is being viewed may have that status change when the user interface element loses focus, or within a threshold period of time of losing focus. This may be the case even if the user interface element associated with the content item is still open. In one embodiment, "viewed" presence information indicates whether a content item is associated with an active user interface element. In one embodiment, "viewed" presence information is retained until the user interface element is not active (or has lost focus) for longer than a threshold amount of time. In one embodiment, the content item is considered "viewed" while the content item is open by an application.

When there is a change to the interaction information, interaction management module 204 sends the interaction information to content management system 110. In one embodiment, the sent presence information includes an identifier of the content item, the process id, the user interface element id, and the presence status.

Figure 5A:
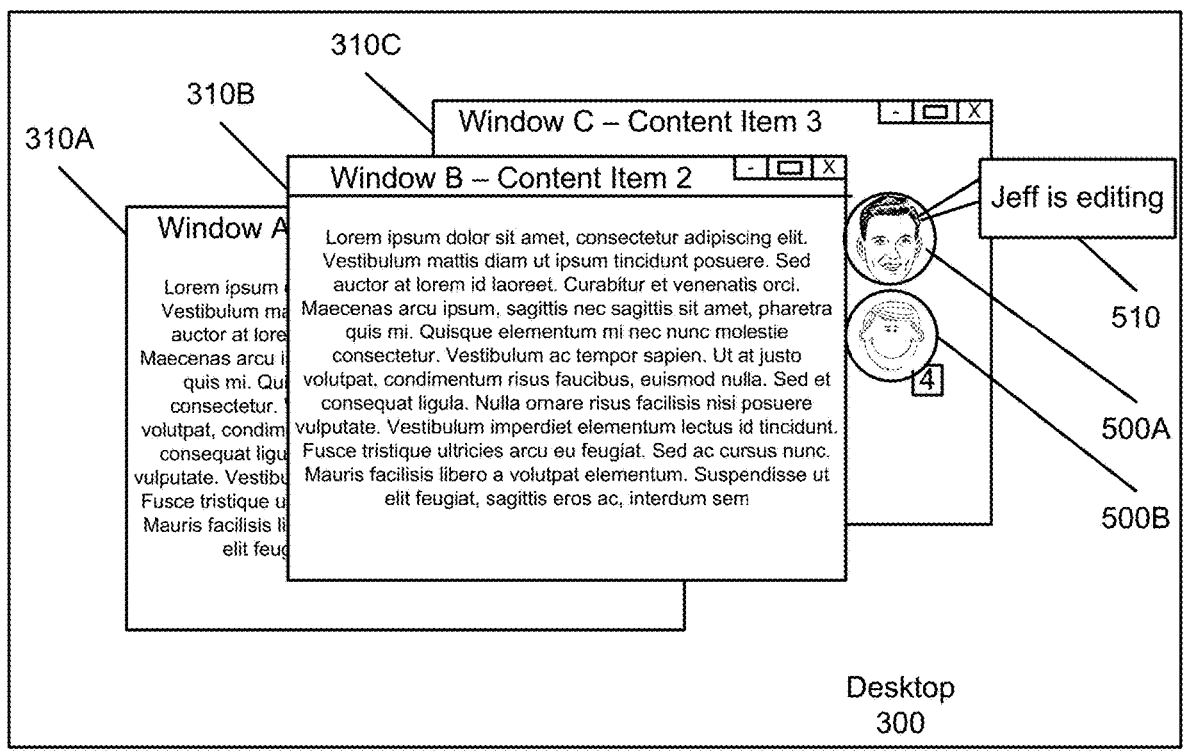
FIGS. 5A-5D show example user interfaces displaying interaction information.

FIGS. 5A-5D show example user interfaces displaying interaction information. Various user interface elements are similar to those depicted in FIGS. 3A and 3B. In FIG. 5A, the example user interface displays presence information. To display presence information, interaction management module 204 provides presence indicator(s) 500 along a boundary or border of the window associated with the content item. In this example, interaction management module 204 receives presence information indicating that user Jeff is editing content item 2 and four users are viewing content item 2. Interaction management module 204 displays presence indicator 500A to indicate that Jeff is editing the document and presence indicator 500B indicating users are viewing the document. In one embodiment, presence indicator 500 displays an icon or picture of a user associated with the presence indicator. The icon or picture may be obtained by interaction management module 204 from contact directory 240, or may be received from content management system 110. The individual user displayed by the presence indicator may vary depending on the embodiment, and may display, for example, the first user having a particular presence (e.g., the first viewer) or the user who most recently opened the content item.

Presence indicator 500 is displayed along with the window associated with the content item, and in one embodiment interaction management module 204 tracks the location of the window and displays presence indicator 500 adjacent to or near the window, for example alongside a border or boundary of the window. A supplemental presence indicator 510 may appear when a user hovers over presence indicator 500 to provide further information or interfaces for the user. In the example shown in FIG. 5A, supplemental presence indicator 510 describes presence indicator 500A, specifically that Jeff is associated with a presence of editing content item 2. Supplemental presence indicator 510 may also appear when a presence changes, to indicate a new user is viewing or editing the document, for example.

The presence indicator 500 and supplemental presence indicator 510 may be located on any convenient area of display 220. In one embodiment the presence indicator is displayed proximal the associated user interface element of the content item so as to visually indicate to the user the relationship between the presence indicator and the specific content item. In addition, the display of the presence indicator along a boundary or border of the window increases the likelihood that the user will notice the presence indicator. In one embodiment, the presence indicators 500 are displayed on or alongside a vertical edge of the window containing the content item (e.g., right edge as shown FIG. 5A).

Alternatively, the presence indicator may be shown in a separate area of the display, such as a taskbar, or tray icon or may be a separate user interface element that does not interact with the user interface element of the content item. Though shown here as a single presence indicator 500 for each type of presence (editing or viewing), any number of presence indicators 500 may be shown related to the content item. For example, a circular indicator may include a count of users viewing the content item and another circular indicator may include a count of users editing the content item. Alternatively, where multiple presence indicators 500 are to be displayed, they may be ordered from top to bottom, where the ordering can be most recent to least recent, or highest priority to lowest priority, or a combination thereof (e.g., ordered by priority, and for presence indicators of the same priority, ordered by recency). The presence indicator, as shown, may also indicate an icon or picture associated with the other user. The indicators may also be color-coded to indicate the risk that a user will affect edits by other users. For example, the presence indicator may be red (or the presence indicator may turn red) when another user is editing, indicating to the user to coordinate any desired modifications with that user's changes. Likewise, the editing indicator may be yellow when other users are viewing the content item, and green when the current user is the only user viewing the content item.

Figure 5B:
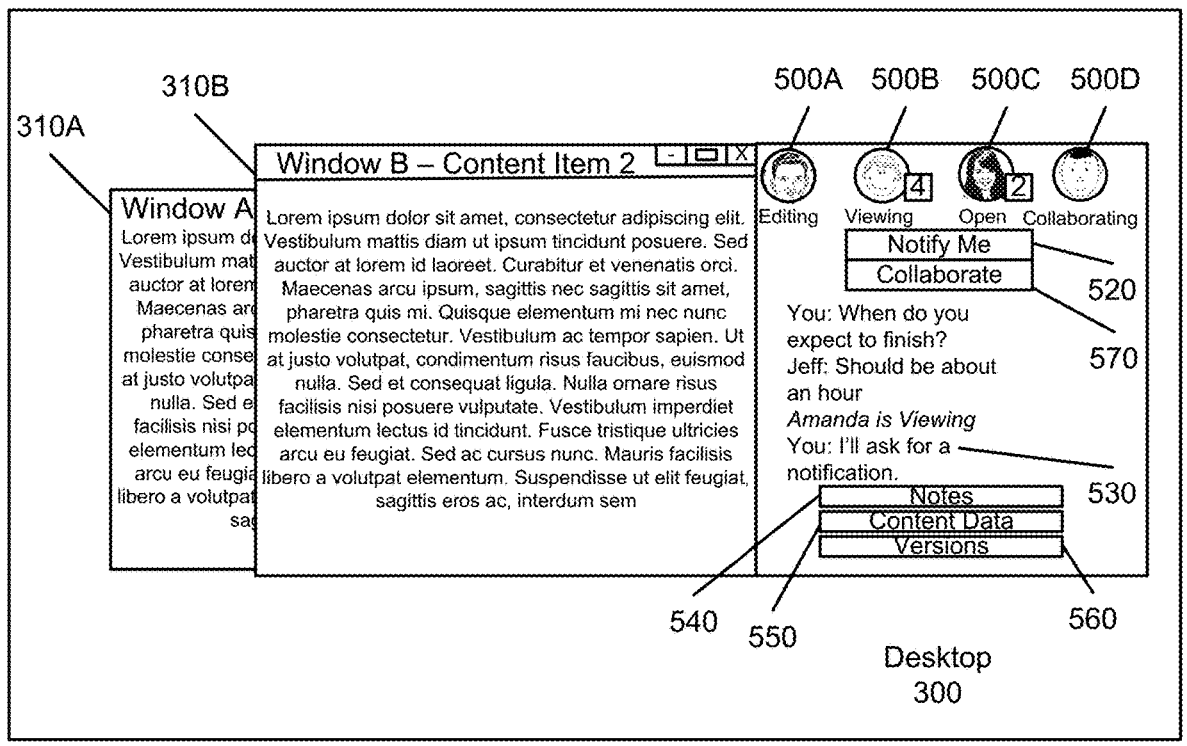

FIG. 5B shows a user interface through which a user may enter interaction information to the interaction management module 204. This interface includes presence indicators 500, in addition to further user interface elements. This interface may be presented in lieu of the example of FIG. 5A, or may be presented as a supplemental presence indicator providing additional data regarding the content item.

The user interface of FIG. 5B provides notification element 520, permitting a user to indicate the user's desire to be notified when a presence change occurs related to another user. Upon selecting notification element 520, the user may further select specific notification options, for example to be notified when a particular user's presence changes (e.g., Jeff is no longer editing), that all users have stopped a particular presence (e.g., no one is editing), or that no users have an active presence (e.g., that no one else is accessing content item 2). The user's notification preference is sent to content management system 110 or the applicable users to request notification when the requested presence changes.

The interface also provides collaboration element 570, permitting a user to initiate a collaboration session with other users who have the content item open. Upon selecting collaboration element 570, the user may further select specific collaboration options. For example, choosing which users to include in a collaboration session and choosing whether to collaborate with editing control.

This interface also provides a chat interface for users to communicate with other users present in the content item. The chat interface permits users to enter and receive messages to other users. Presence changes may also be indicated in the chat window, for example that Amanda is now viewing the content item. The chat window may permit users to specifically discuss information relating to that content item, such as when a user expects to finish editing the item. These chat messages are received by interaction management module 204 as interaction information and sent to other clients synchronized to the content item. This permits users to chat directly about a content item, even if the native application provides no chat functionality.

Notes user interface 540 permits a user to retrieve and enter notes stored in association with the content item. When notes interface 540 is selected, interaction management module 204 requests any notes or other persistent information from content management system 110 relating to the content item and displays any such notes to the user along with an interface for entering additional notes to be sent to other synchronized devices and content management system 110. Like the chat window, this permits additional notes to be entered for a content item and application providing the user interface which may not natively provide for any note functionality. The notes element 540 may also be used when no other users are present within the content item and may be used to leave messages for other users about a content item.

Content data element 550 permits a user to request additional data about the content item, such as any related metadata, user permissions, and so forth. This permits a user to request details of the content item from the content management system directly from an interface near the user interface element associated with the content item.

Similarly, versions element 560 indicates a request for version information. Interaction management module 204 transmits the request for version information to content management system 110 as interaction information related to the content item. In response, content management system 110 identifies relevant version information for the content item. In one embodiment, a prior version is compared side-by-side with the version of the content item displayed in the user interface element. In another embodiment, the prior version is compared in-line in the user interface element.

Figure 5C:
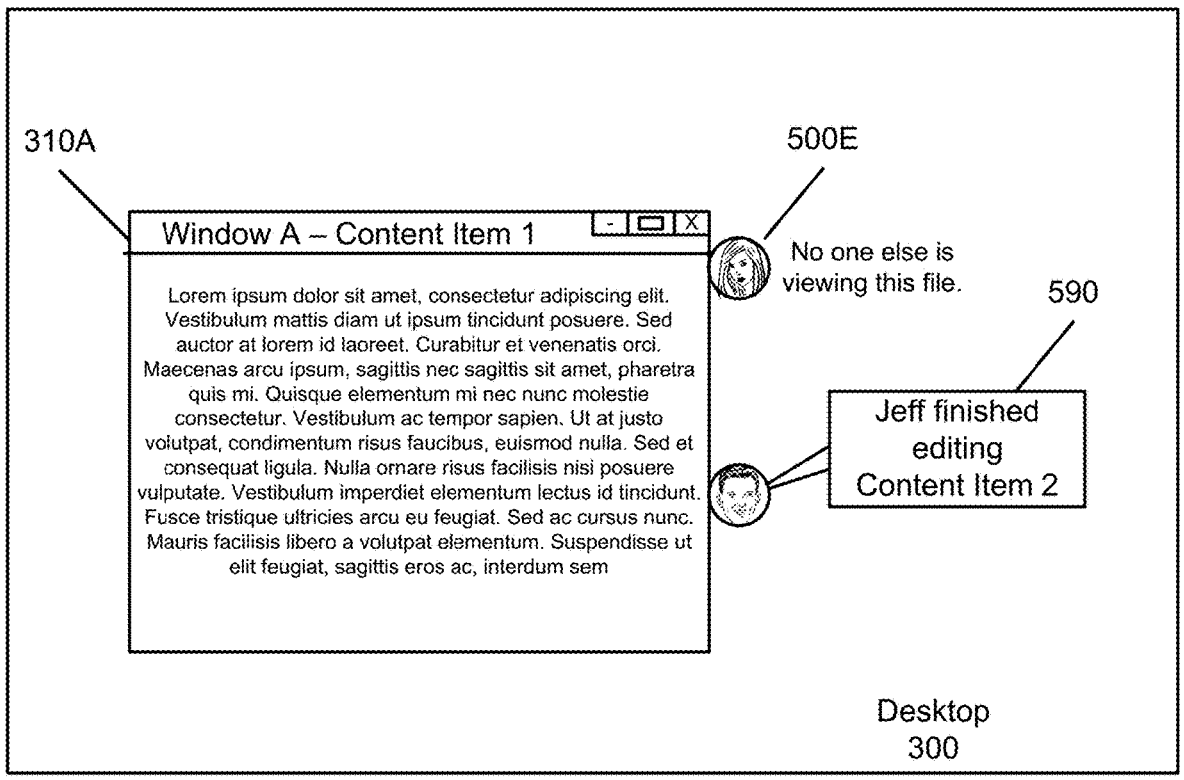

FIG. 5C shows a user interface in which a user is notified about a change in presence related to another content item. In this case, a user had previously selected to be notified when user Jeff finished editing content item 2, using notification element 520. After requesting notification, the user proceeded to close window 310B relating to content item 2, and is presently viewing content item 1. In this embodiment, presence indicator 500E indicates that the user is the only user with presence relating to this content item. This may be espressly indicated ("No one else is viewing this file") as shown, or may be provided if a user interacts with presence indicator 500E. Interaction management module 204 receives a notification that Jeff has finished editing content item 2. The notification 590 is displayed to the user. This notification is provided though the user may be interacting with another application or another content item than the content item to which the notification relates.

Figure 5D:
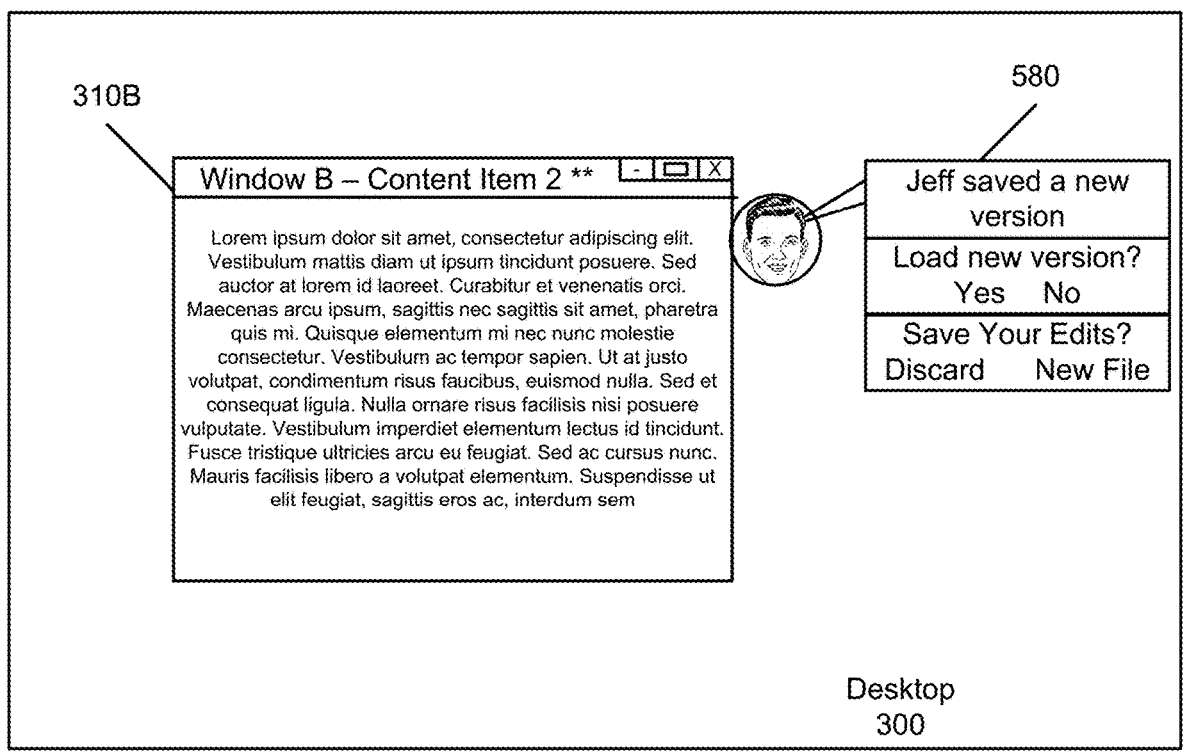

FIG. 5D shows a user interface in which a user receives a notification that a content item has been modified. In this example, a new version of content item 2 viewed by the user has been saved by another user, Jeff. Interaction management module 204 receives a message from content management system 110 indicating that content item 2 has been modified and a new version is available. Typically, the user's edits may be lost if the user attempted to synchronize the user's edits to content management system 110 because the user's edits would be out of date with the version maintained by content management system 110. Using the presence information indicating the user is editing the content item, the user can be provided choices to assist in incorporating any edits from Jeff into the user's edits. A version notification 580 is presented to the user, along with choices to make in response to the new version. In this example, the user may elect to load the new version, discard the user's edits, or save the user's edits as a new file. The particular choices available to a user may be provided by content management system 110 based on content management system 110's record of the device's presence 100, as further described below. In another embodiment, interaction management module 204 determines options for display to the user.

In embodiments where interaction management module 204 is a separate application from the native application 255 of window 310B, presence indicators 500 are provided by interaction management module 204. Thus, interaction management module 204 monitors presence information associated with the application, and displays presence information relating to other users for a content item associated with the application. When other windows are activated, the same interaction management module 204 displays presence information relating to the activated window.

To display the presence indicator(s), interaction management module 204 receives the presence information for other devices, typically from the content management system 110. Interaction management module 204 determines that a synchronized content item is in use by a window or process, and that the window is being displayed to the user. For example, interaction management module 204 may receive a presence event from the window or process being monitored as described above. When the presence event indicates that the window has the focus, interaction management module 204 adds the presence indicator to the display. Interaction management module 204 in one embodiment also tracks movement of the window in the desktop and moves the presence indicators to maintain the location of the presence indicators relative to the window.

In one embodiment, to add the presence indicator to the display, interaction management module 204 determines the location of the focused window and its boundaries, and adds the presence indicator adjacent to the window boundary. When interaction management module 204 identifies that the focused window has changed, the presence indicator for that content item may also be removed until that window is focused again.

Referring again to FIG. 5B, in one embodiment, collaboration element 570 is displayed in association with a content item that is open for viewing or editing in native applications on at least two devices. A viewing or editing user may initiate collaboration via collaboration element 570. During collaboration one device assumes the role of primary device, and other device(s) are secondary devices. The primary device is the device having the instance of the content item in which collaboration occurs. Secondary devices therefore provide viewing and editing functionality with respect to the instance of the content item located on the primary device. There may be multiple secondary devices for a given collaboration session, but only one primary device.

Prior to collaboration, an instance of the content item may be open for viewing or editing on what will become the secondary device. In one embodiment, collaboration element 570 prompts one of the users, e.g., the requesting user, to choose which device will be the primary device for the collaboration session. In another embodiment, the primary device is chosen by collaboration module 207. For example, if one user has the content item open for editing and another has the item open for viewing, collaboration module 207 designates the device on which the item is being edited as primary.

Figure 6A:
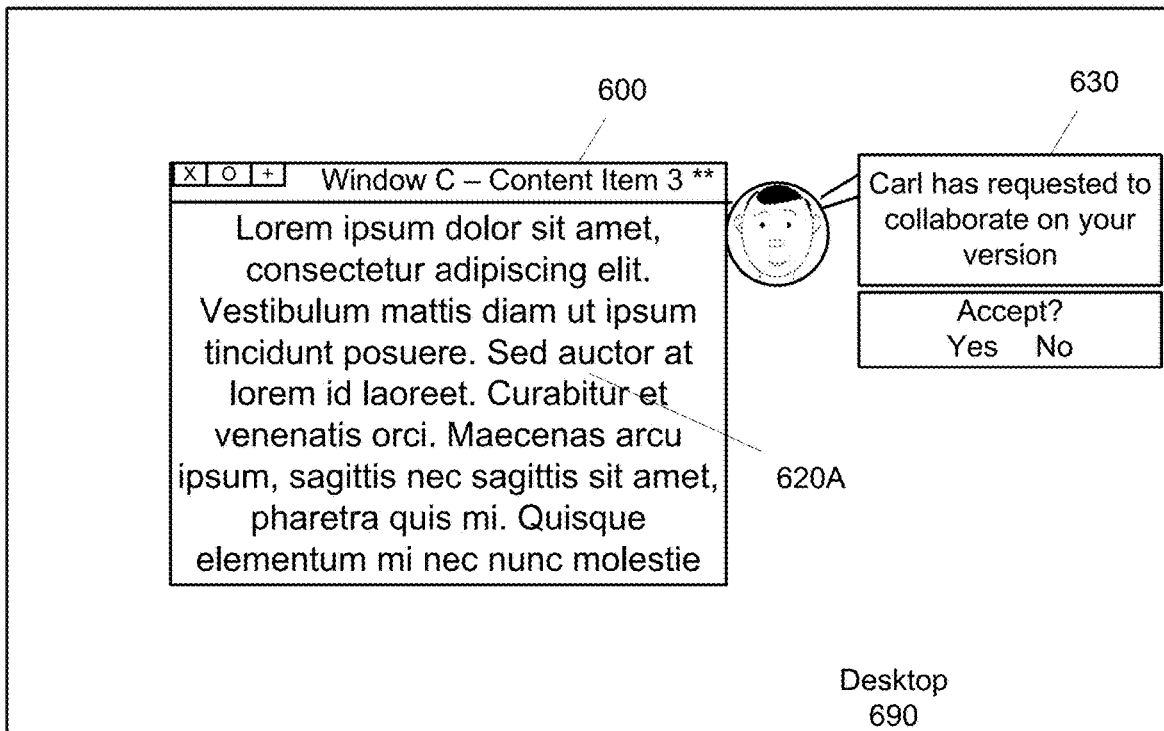
FIGS. 6A-6F show example user interfaces for users in a collaboration session.
Figure 6B:
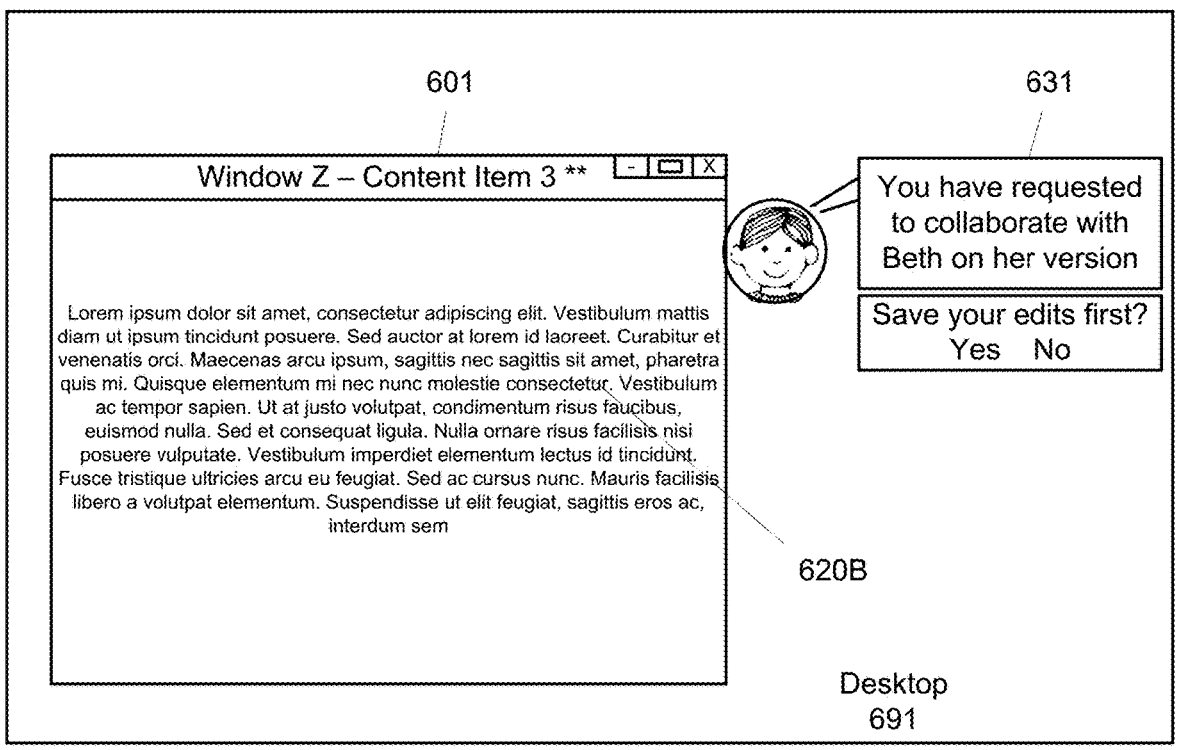

FIGS. 6A-6F show example user interfaces for a collaboration session. A primary device may receive a request to collaborate on content item 620 from a user of the primary device or from a user of another device. In one embodiment, a request may be made by a user of a secondary device from within a native application, or from a file list or other user interface that displays presence information about the content item. For example, FIG. 6A shows a user interface in which a user receives a request to collaborate from another device. In FIG. 6A, desktop 690 is on a device being used by Beth. Carl has requested to collaborate on Beth's version 620A of a content item 620, which Beth has open in window 600 of a native application executing on her device. Because Carl has requested to collaborate on Beth's verision 620A of content item 620, Beth's device has been designated as the primary device for this collaboration session, and window 600 is the primary window. FIG. 6B shows desktop 691 of a device being used by Carl. Carl has a version 620B of content item 620 open for editing in window 601 of a native application on Carl's device. Carl's device is a secondary device for this collaboration session.

In one embodiment, when the collaboration module 207 of a primary device receives a collaboration request from another device, the user of the primary device may choose to accept or reject the request. Request element 630 is an example user interface element for a user to instruct the device to accept or reject a request. Likewise, if a primary device receives instruction from a user of the primary device for the device to request collaboration, collaboration module 207 of the primary device sends a request to collaboration modules 207 of secondary devices to begin collaboration. The users of the secondary devices choose whether to accept or reject the request, and instruct the devices to accept or reject a request via request element 630 or a similar user interface element.

For a primary device, if a request is accepted, or if acceptance is not required, collaboration module 207 identifies the primary window and determines the region of display 220 of the device that is occupied by the primary window. Collaboration module 207 captures the determined region. Collaboration module 207 shares the captured region with one or more secondary devices. Capturing and sharing the determined region may be accomplished by any of several desktop sharing techniques known in the art (e.g., Virtual Network Computing (VNC), APPLE Remote Desktop (ARD), MICROSOFT RDP, CITRIX ICA, TERADICI PCoIP).

In some instances, it may be desirable to capture and share less than the entire region occupied by the primary window. For example, the user of the primary device may not want the secondary device users to see window controls, comment areas, or other portions of the primary window. In such a case, collaboration module 207 determines the parts of the region to omit from capture and sharing. In one embodiment, window controls provided by the operating system are omitted from the shared region. In another embodiment, the user is allowed to choose, via a user interface, whether to share or omit window controls, comment areas, or other portions of the primary window.

Figure 7:
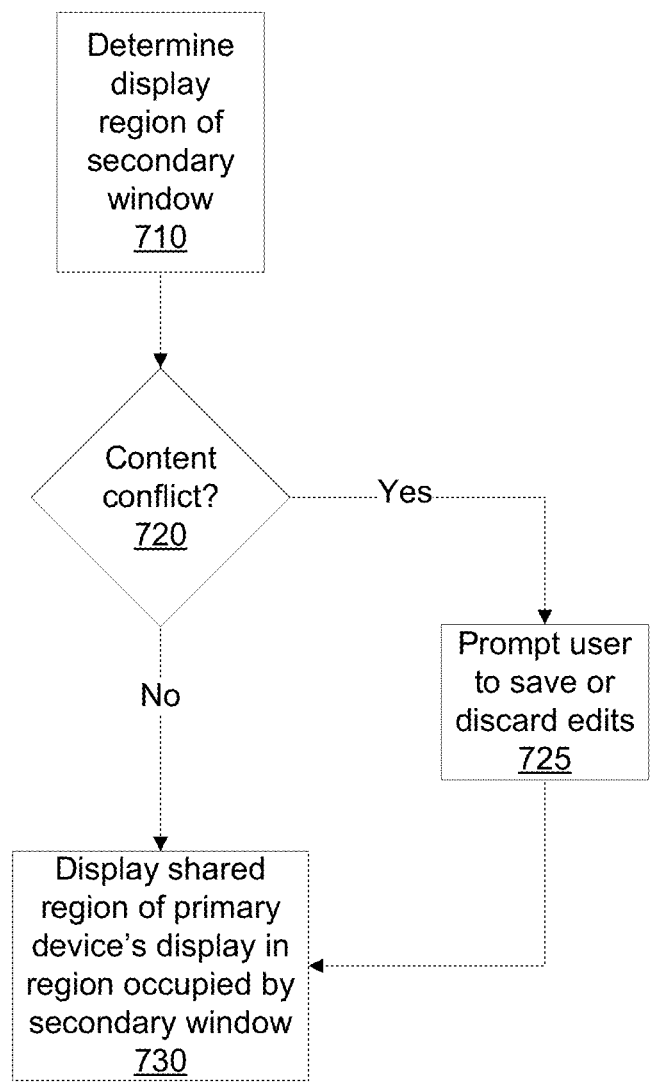
FIG. 7 shows an example process for initiating a user collaboration session according to one embodiment.

FIG. 7 shows an example process for initiating collaboration on a secondary device. For a secondary device, if a collaboration request is accepted, or if acceptance is not required, collaboration module 207 identifies 710 the secondary window and determines the region of the display 220 of the secondary device that is occupied by the secondary window. Additionally, interaction management module 204 determines 720 whether the content items open on the primary and secondary devices have unsaved or unsynchronized changes. If the content item versions differ, the secondary device prompts 725 the user to either save or discard the changes to the content item. Referring again to FIG. 6B, conflicts element 631 is an example user interface element for prompting a user to save or discard changes to a content item. In one embodiment, if the user of a secondary device chooses to save the changes to a content item, the user of the primary device is also alerted by collaboration module 207 and presented with an option to collaborate using the version of the changed content item or the unchanged version of the content item.

In one embodiment, if there is no content conflict, or if the conflict has been resolved, collaboration module 207 receives the shared region from the primary device and displays 730 the shared region in the area of the display 220 of the secondary device that is occupied by the secondary window. In one embodiment, the size of the secondary window is increased or decreased to fit the dimensions of the shared region from the primary device as may be possible given differences in displays, e.g., screen size.

In one embodiment, a collaboration session also includes audio and/or video communication between collaborating devices. For example, responsive to initiation of a collaboration session, a device associated with the collaboration session may send audio from a microphone of the device to an other device and receive audio from the other device to enable audio communication between users of the devices. In one embodiment, a device associated with the collaboration session may send video from a camera of the device to an other device and receive video from the other device to enable video communication between users of the devices.

Figure 6C:
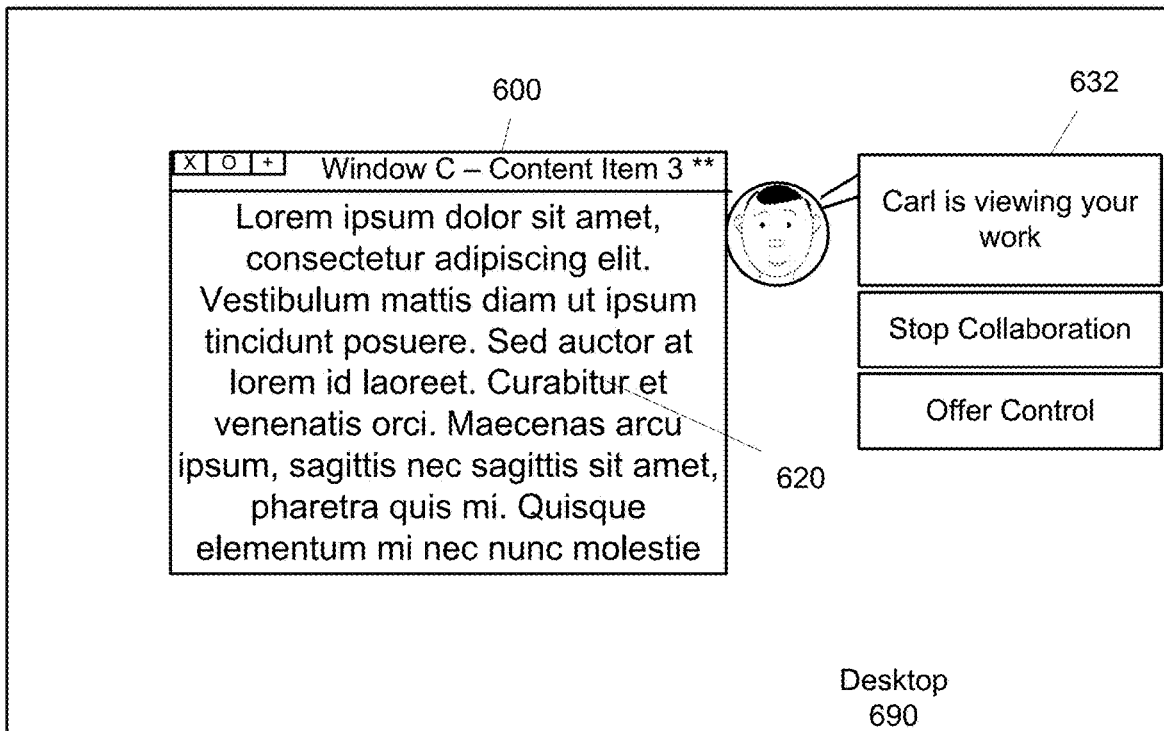
Figure 6D:
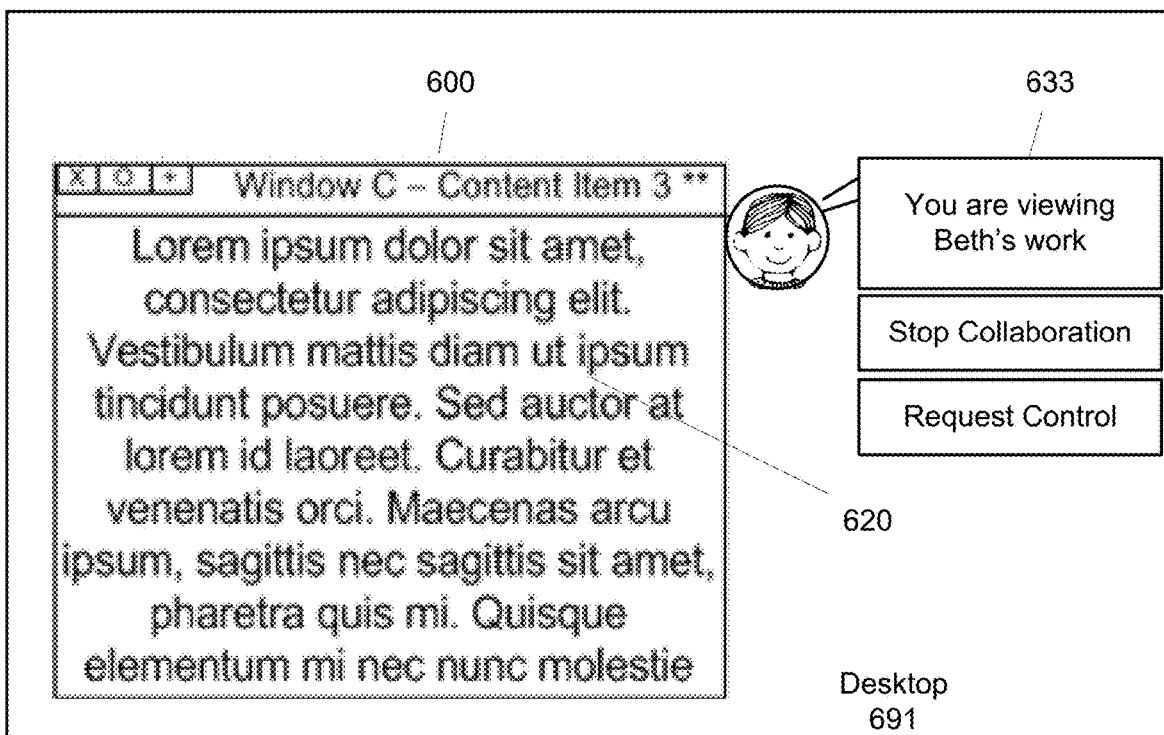

FIGS. 6C and 6D show example user interfaces during a collaboration session for primary and secondary devices, respectively. Referring to FIG. 6D, the region of Carl's display that was occupied by window 601 prior to collaboration is now occupied by a shared version of window 600. Collaboration status elements 632, 633 are example user interface elements to notify users that collaboration is occurring. On the primary device, collaboration status element 632 allows Beth to stop collaboration or offer control of the input devices of her device to Carl. Similarly, collaboration status element 633 allows Carl to stop collaboration or request control of one or more input devices of Beth's device.

In one embodiment, when input device control is offered by a user of a primary device to a user of a secondary device, the collaboration module 207 of the primary device sends a message to the collaboration module 207 of the secondary device offering control. The message allows the user of the secondary device to accept or reject the offer of control. If the offer is accepted, the secondary device is given the ability to send inputs (e.g., by a keyboard, a mouse, etc.) to the shared region of the primary device. In one embodiment, the primary device also retains ability to also provide input. In still another embodiment, the control of one or more input devices is limited to a different region of the display of the primary device. Control of the one or more input devices may also be limited further, for instance by disabling various keystrokes or key combinations on a keyboard. Methods for sharing control of an input device as well as for limiting that control are well known in the art.

In one embodiment, when input device control is requested by a user of a secondary device, the collaboration module 207 of the secondary device sends a message to the collaboration module 207 of the primary device requesting control. The message allows the user of the primary device to accept or reject the request for control. If the request is accepted, the secondary device is given control of one or more user input devices of the primary devices.

Figure 6E:
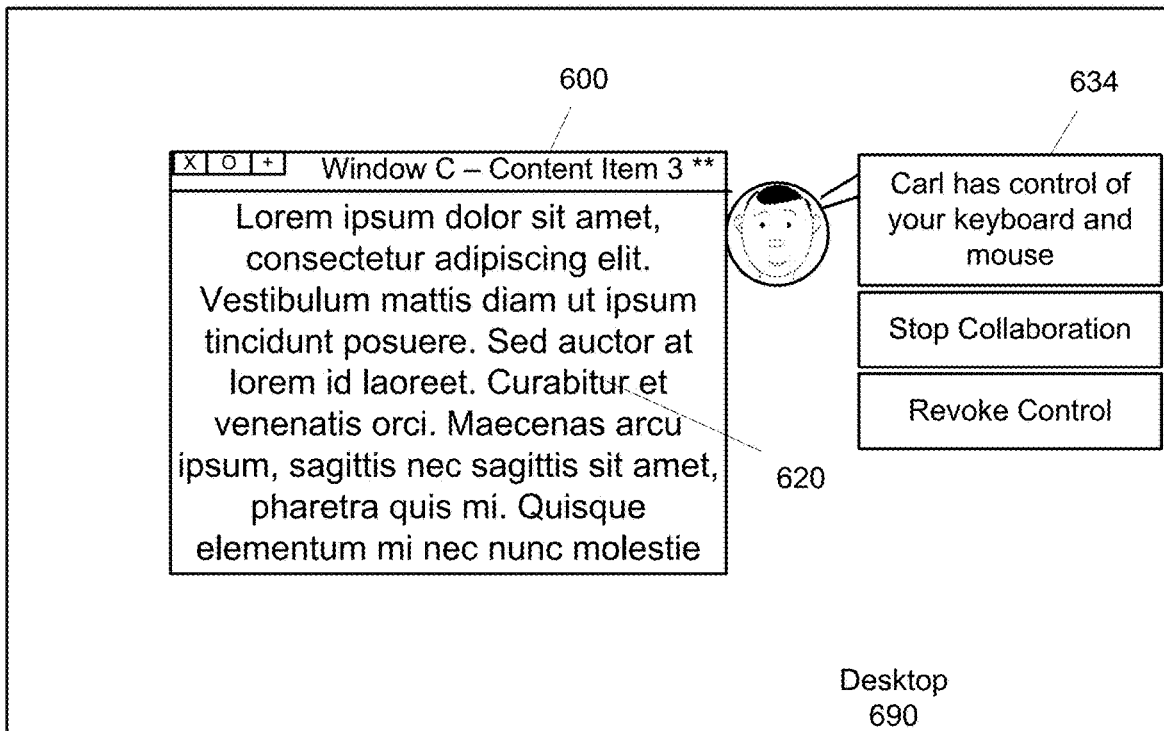
Figure 6F:
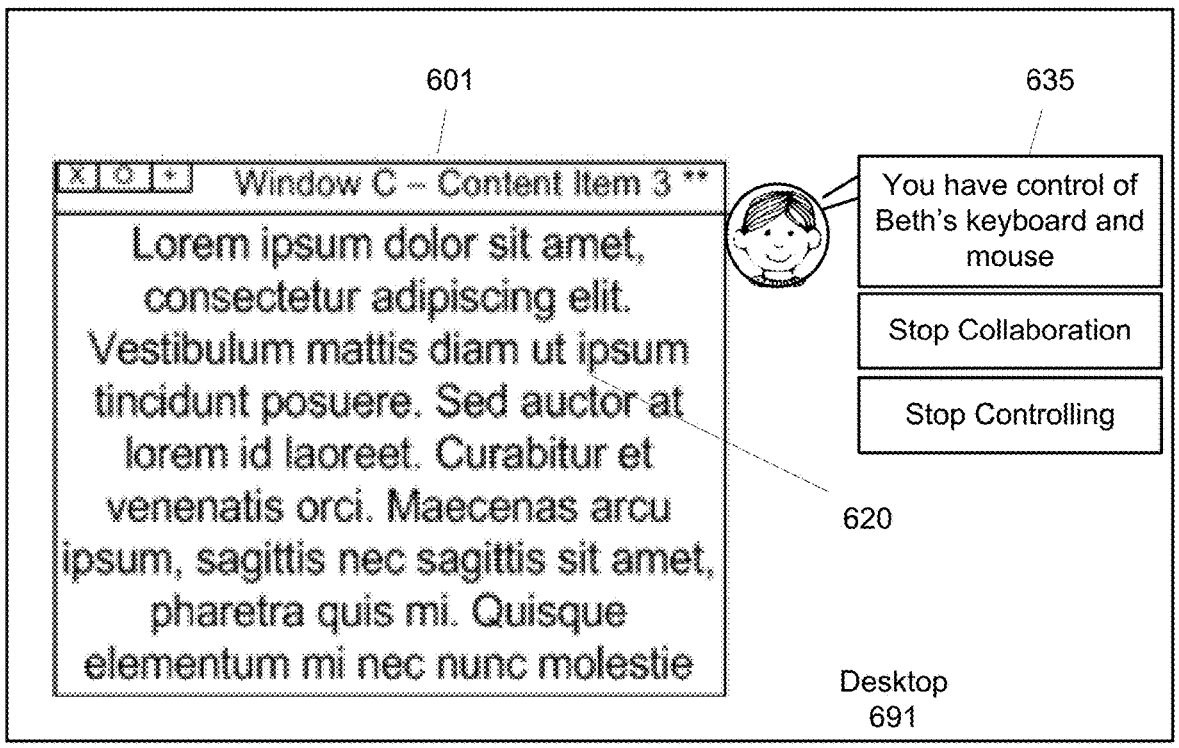

FIGS. 6E and 6F show example user interfaces during a collaboration session with control sharing. In this example, both Carl and Beth have control of Beth's keyboard and mouse, meaning Carl can control Beth's cursor and keyboard commands into Beth's device using his own keyboard and mouse. In other embodiments, control may be shared for other types of user input devices, including drawing tablets or recording devices. Control status elements 634, 635 are example user interface elements to notify users that a collaboration session with control is occurring. On the primary device, control status element 634 allows Beth to stop collaboration or revoke control from Carl. Similarly, on the secondary device, control status element 635 allows Carl to stop collaboration or stop controlling Beth's mouse and keyboard.

In some embodiments, user input device control, including cursor and keyboard command control, is limited. User input device control may be limited to a specific region of the display of the primary device or to specific input actions associated with user input device. User input actions include keystrokes and key combinations, click combinations as well as other actions. For example, cursor controls may be limited to a specific region of the display of Beth's device. As such, Carl could not move the cursor outside of certain regions of the display of Beth's device. An example region is the area occupied by the primary window, but other regions may exist that are smaller or larger than the area occupied by the primary window. Additionally, cursor control may be limited with respect to various controls on the display of the primary device, including system buttons or controls to access sensitive information of the user of the primary device. As another example, Carl's control of keyboard command entry may be limited. For instance, Carl may be unable to enter certain keystrokes or keystroke combinations into Beth's device. Methods and systems for limiting user input device control are well known in the art, and could be accomplished by either primary or secondary client application 200, by another module of device 100, by content management system 110, or by some combination of modules.

Figure 8A:
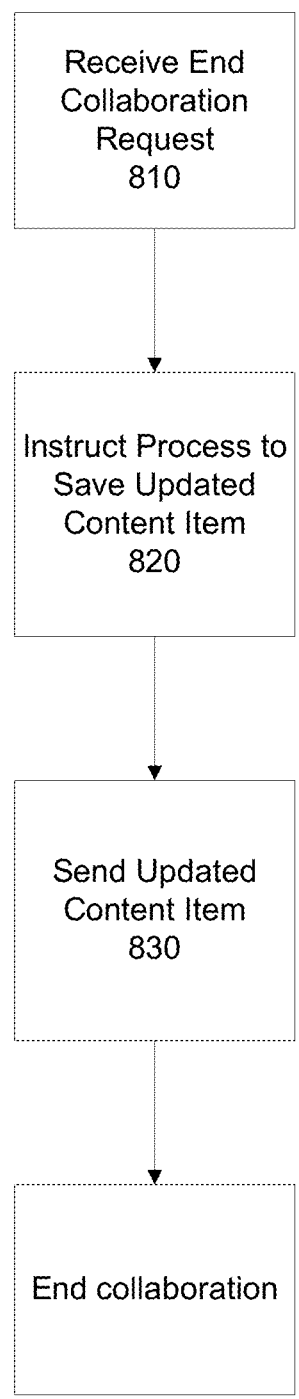
FIGS. 8A and 8B show example processes for ending collaboration.
Figure 8B:
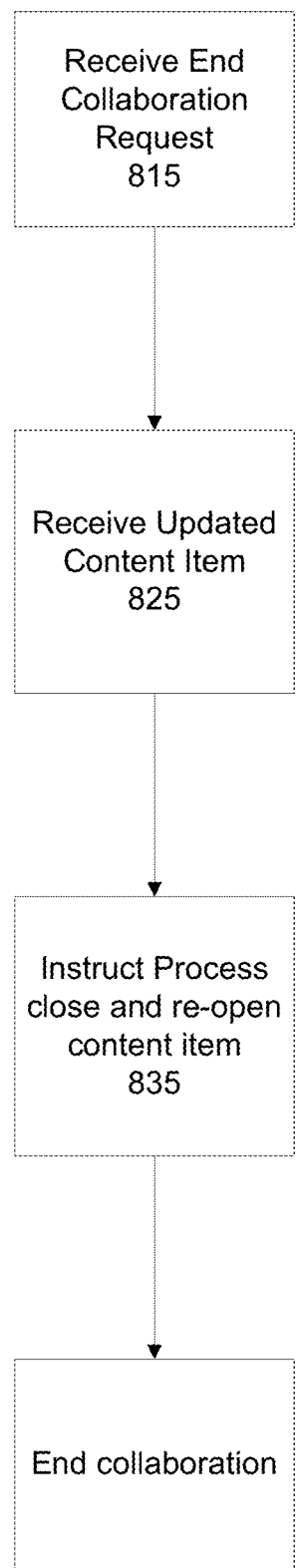

FIGS. 8A and 8B show example processes for ending collaboration. FIG. 8A shows an example process for ending collaboration on a primary device. The collaboration module 207 of a primary device receives 810 a request to end collaboration. The request to end collaboration may be received from a user input to the primary device, such as via the stop collaboration button of collaboration status element 632, or from a secondary device, such as the user of a secondary device inputs a stop collaboration request, and the collaboration module 207 of the secondary device sends that request to the collaboration module 207 of the primary device. Responsive to receiving 810 the request to end collaboration, the action sent to the process controlling the user interface element associated with the content item instructs 820 the process to save the updated content item on the device. The collaboration module 207 then sends 830 the updated content item to either content management system 110 or directly to the secondary devices. If the content item is sent to content management system 110, the content item is sent to secondary devices pursuant to the protocols of content management system 110. FIG. 8B shows an example process for ending collaboration on a secondary device. The collaboration module 207 of a secondary device receives 815 a request to end collaboration. The request to end collaboration may be received from a user input to the secondary device such as the stop collaboration button of collaboration status element 633, or from a secondary device such as when the user of a primary device inputs a stop collaboration request, and the collaboration module 207 of the primary device sends that request to the collaboration module 207 of the secondary device. Responsive to receiving 815 the request to end collaboration, the collaboration module 207 of the secondary device receives 825 the updated content item. The updated content item may be received directly from the primary device, or via content management system 110. Responsive to receiving the updated content item, the action sent to the process controlling the user interface element associated with the content item instructs 835 the process to close and re-open content item on the device. Upon ending collaboration, the primary window is no longer displayed on the secondary device. The instruction 835 may occur before or after the display of the primary window on the secondary device is terminated. In another embodiment, display of the primary window on the secondary device is terminated, and the user is instructed to close and re-open the content item to reflect the changes.

Figure 9:
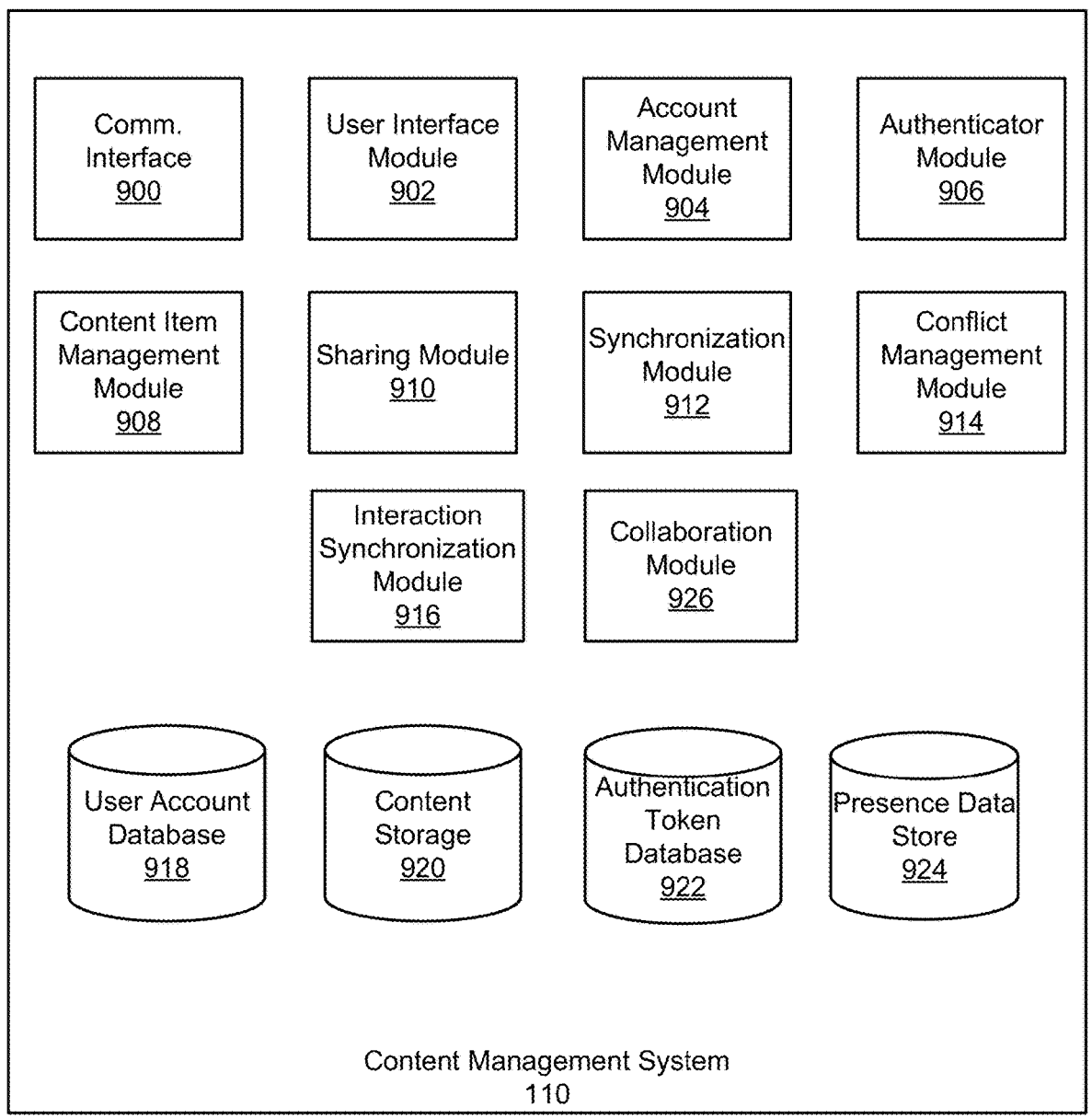
FIG. 9 shows components of a content management system, according to one embodiment.

FIG. 9 shows components of content management system 110 of FIG. 1, according to one embodiment. In one configuration, components described below with reference to content management system 110 are incorporated into devices 100 that share and synchronize content items without management by content management system 110. These devices 100 may synchronize content and share interaction information over network 120 or via a direct connection as described above. In this configuration, devices 100 may incorporate functionality of synchronization module 912, conflict management module 914, interaction synchronization module 916, and other modules and data stores for incorporating functionality described below as provided by content management system 110. Accordingly, devices 100 in this configuration operate in a peer-to-peer configuration and may do so without content management system 110 or network 120.

When using content management system 110, to facilitate the various content management services, a user can create an account with content management system 110. The account information can be maintained in user account database 918, and is one means for performing this function. User account database 918 can store profile information for registered users. In some cases, the only personal information in the user profile can be a username and/or email address. However, content management system 110 can also be configured to accept additional user information, such as password recovery information, demographics information, payment information, and other details. Each user is associated with an identifier, such as a userID or a user name.

User account database 918 can also include account management information, such as account type, e.g., free or paid; usage information for each user, e.g., file edit history; maximum storage space authorized; storage space used; content storage locations; security settings; personal configuration settings; content sharing data; etc. Account management module 904 can be configured to update and/or obtain user account details in user account database 918. Account management module 904 can be configured to interact with any number of other modules in content management system 110.

An account can be associated with multiple devices 100, and content items can be stored in association with an account. The stored content can also include folders of various types with different behaviors, or other content item grouping methods. For example, an account can include a public folder that is accessible to any user. The public folder can be assigned a web-accessible address. A link to the web-accessible address can be used to access the contents of the public folder. In another example, an account can include a photo folder that is intended for photo content items and that provides specific attributes and actions tailored for photos; an audio folder that provides the ability to play back audio file content items and perform other audio related actions; or other special purpose folders. An account can also include shared folders or group folders that are linked with and available to multiple user accounts. The permissions for multiple users may be different for a shared folder. In one embodiment, the account is a namespace that may be associated with several users, each of whom may be associated with permissions to interact with the namespace.

The content can be stored in content storage 920, which is one means for performing this function. Content storage 920 can be a storage device, multiple storage devices, or a server. Alternatively, content storage 920 can be a cloud storage provider or network storage accessible via one or more communications networks. In one configuration, content management system 110 stores the content items in the same organizational structure as they appear on the device. However, content management system 110 can store the content items in its own order, arrangement, or hierarchy.

Content storage 920 can also store metadata describing content items, content item types, and the relationship of content items to various accounts, folders, or groups. The metadata for a content item can be stored as part of the content item or can be stored separately. In one configuration, each content item stored in content storage 920 can be assigned a system-wide unique identifier.

Content storage 920 can decrease the amount of storage space required by identifying duplicate content items or duplicate segments of content items. In one embodiment, for example, a content item may be shared among different users by including identifiers of the users within ownership metadata of the content item (e.g., an ownership list), while storing only a single copy of the content item and using pointers or other mechanisms to link duplicates with the single copy. Similarly, content storage 920 stores content items using a version control mechanism that tracks changes to content items, different versions of content items (such as a diverging version tree), and a change history. The change history includes a set of changes that, when applied to the original content item version, produces the changed content item version.

Content management system 110 automatically synchronizes content items from one or more devices, using synchronization module 912, which is one means for performing this function. The synchronization is platform-agnostic. That is, the content items are synchronized across multiple devices 100 of varying type, capabilities, operating systems, etc. For example, client application 200 synchronizes, via synchronization module 912 at content management system 110, content in the file system of device 100 with the content items in an associated user account on system 110. Client application 200 synchronizes any changes to content items in a designated folder and its sub-folders with the synchronization module 912. Such changes include new, deleted, modified, copied, or moved files or folders. Synchronization module 912 also provides any changes to content associated with device 100 to client application 200. This synchronizes the local content at device 100 with the content items at content management system 110.

Conflict management module 914 determines whether there are any discrepancies between versions of a content item located at different devices 100. For example, when a content item is modified at one device and a second device, differing versions of the content item may exist at each device. Synchronization module 912 determines such versioning conflicts, for example by identifying the modification time of the content item modifications. Conflict management module 914 resolves the conflict between versions by any suitable means, such as by merging the versions, or by notifying the device of the later-submitted version.

A user can also view or manipulate content via a web interface generated by user interface module 902. For example, the user can navigate in web browser 250 to a web address provided by content management system 110. Changes or updates to content in content storage 620 made through the web interface, such as uploading a new version of a file, are synchronized back to other devices 100 associated with the user's account. Multiple devices 100 may be associated with a single account and files in the account are synchronized between each of the multiple devices 100.

Content management system 110 includes communications interface 900 for interfacing with various devices 100, and with other content and/or service providers via an Application Programming Interface (API), which is one means for performing this function. Certain software applications access content storage 920 via an API on behalf of a user. For example, a software package, such as an app on a smartphone or tablet computing device, can programmatically make calls directly to content management system 110, when a user provides credentials, to read, write, create, delete, share, or otherwise manipulate content. Similarly, the API can allow users to access all or part of content storage 920 through a web site.

Content management system 110 can also include authenticator module 906, which verifies user credentials, security tokens, API calls, specific devices, etc., to determine whether access to requested content items is authorized, and is one means for performing this function. Authenticator module 906 can generate one-time use authentication tokens for a user account. Authenticator module 906 assigns an expiration period or date to each authentication token. In addition to sending the authentication tokens to requesting devices, authenticator module 906 can store generated authentication tokens in authentication token database 922. Upon receiving a request to validate an authentication token, authenticator module 906 checks authentication token database 922 for a matching authentication token assigned to the user. Once the authenticator module 906 identifies a matching authentication token, authenticator module 906 determines if the matching authentication token is still valid. For example, authenticator module 906 verifies that the authentication token has not expired or was not marked as used or invalid. After validating an authentication token, authenticator module 906 may invalidate the matching authentication token, such as a single-use token. For example, authenticator module 906 can mark the matching authentication token as used or invalid, or delete the matching authentication token from authentication token database 922.

Content management system 110 includes a sharing module 910 for sharing content publicly or privately. Sharing content publicly can include making the content item accessible from any computing device in network communication with content management system 110. Sharing content privately can include linking a content item in content storage 920 with two or more user accounts so that each user account has access to the content item. The content can also be shared across varying types of user accounts.

In some embodiments, content management system 110 includes a content management module 908 for maintaining a content directory that identifies the location of each content item in content storage 920, and allows client applications to request access to content items in the storage 920, and which is one means for performing this function. A content entry in the content directory can also include a content pointer that identifies the location of the content item in content storage 920. For example, the content entry can include a content pointer designating the storage address of the content item in memory. In some embodiments, the content entry includes multiple content pointers that point to multiple locations, each of which contains a portion of the content item.

In addition to a content path and content pointer, a content entry in some configurations also includes a user account identifier that identifies the user account that has access to the content item. In some embodiments, multiple user account identifiers can be associated with a single content entry indicating that the content item has shared access by the multiple user accounts.

To share a content item privately, sharing module 910 adds a user account identifier to the content entry associated with the content item, thus granting the added user account access to the content item. Sharing module 910 can also be configured to remove user account identifiers from a content entry to restrict a user account's access to the content item.

To share content publicly, sharing module 910 generates a custom network address, such as a URL, which allows any web browser to access the content in content management system 110 without any authentication. The sharing module 910 includes content identification data in the generated URL, which can later be used by content management system 110 to properly identify and return the requested content item. For example, sharing module 910 can be configured to include the user account identifier and the content path in the generated URL. The content identification data included in the URL can be transmitted to content management system 110 by a device to access the content item. In addition to generating the URL, sharing module 910 can also be configured to record that a URL to the content item has been created. In some embodiments, the content entry associated with a content item can include a URL flag indicating whether a URL to the content item has been created.

Content management system 110 may be implemented using a single computer, or a network of computers, including cloud-based computer implementations. For the purposes of this disclosure, a computer is device having one or more processors, memory, storage devices, and networking resources. The computers are preferably server class computers including one or more high-performance CPUs and 1 G or more of main memory, as well as 500 Gb to 2 Tb of computer readable, persistent storage, and running an operating system such as LINUX or variants thereof. The operations of content management system 110 as described herein can be controlled through either hardware or through computer programs installed in computer storage and executed by the processors of such server to perform the functions described herein. These systems include other hardware elements necessary for the operations described here, including network interfaces and protocols, input devices for data entry, and output devices for display, printing, or other presentations of data, but which are not described herein. Similarly, conventional elements, such as firewalls, load balancers, failover servers, network management tools and so forth are not shown so as not to obscure the features of the system. Finally, the functions and operations of content management system 110 are sufficiently complex as to require implementation on a computer system, and cannot be performed in the human mind simply by mental steps.

Interaction synchronization module 916 manages synchronization of interaction information across devices 100. Devices 100 provide interaction information to interaction synchronization module 916. Interaction synchronization module 916 responds to interaction information based on the type of interaction information received. As interaction synchronization module 916 uses presence information to determine a response for certain types of interaction information, treatment of received presence information is described first, with treatment of additional types of interaction information described further below.

Interaction synchronization module 916 receives presence information from a device, stores it as part of a presence record in presence data store 924 and determines a user presence with respect to a content item. Each user may be associated with a user presence describing presence records associated with that user with respect to a content item, which may be without reference to any particular user device, process, or user interface element. While presence information may describe presence with respect to a particular user interface element or process, this presence associated with a user is termed a user presence. Example user presence includes collaborating (primary), collaborating (secondary), editing, viewing, open, and not present. In this example, a "collaborating (primary)" user presence indicates the content item is associated with a user interface element that is sharing the content item, a "collaborating (secondary)" user presence indicates the content item is associated with a user interface element that is displaying a shared content item, an "editing" user presence indicates the content item is associated with a user interface element that has modified the content item, a "viewing" user presence indicates the content item is associated with an active user interface element on a device 100, while an "open" user presence indicates a user interface element is associated with the content item and has opened the content item, but has not yet closed the content item. Various embodiments may use more or fewer user presences. For example, one embodiment includes only "editing" "viewing" and "not present," in which case user interface elements that have opened the content item but are not the active user interface element may be treated as viewing or not presence, according to the configuration of the system.

In one embodiment, content management system 110 includes collaboration module 926. Collaboration module 926 can be configured to facilitate collaboration between devices 100. For instance, collaboration module 926 may initiate a device handshake by sharing a device's address with another device so that collaboration may occur. Further, collaboration module 926 may be configured to perform any of the tasks that are performed by collaboration module 207 of a device 100 or by any other module of client application 200.

FIG. 10 shows an ordering of user presence according to one embodiment. The ordering as shown in FIG. 10 describes the priority of interaction with a content item associated with each user presence. In this example, a user has a higher priority of interaction with a content item when the user is collaborating in a content item relative to editing a content item, a higher priority of interaction when editing a content item relative to viewing the content item, and likewise viewing a content item in an active user interface element is a higher priority of interaction than a user interface element that has the content item open.

Since a user may open a content item across several devices and across several processes and user interface elements, the ordering is used to determine the highest priority of user interaction of that user. This permits the user presence to reflect the highest priority of user presence associated with the various possible devices and user interface elements associated with a user. This user presence is sent to devices 100 for display as shown in FIGS. 5A-5D, and permits a single user presence indicating the highest priority of user interaction to be shown.

FIG. 11 shows a presence record in presence table 1100 relating to a content item. Presence table 1100 may be stored, for example, in presence data store 924. Presence information received by interaction synchronization module 916 is converted into a presence record for storage in presence data store 924. When presence records are stored in presence data store 924, the presence records may be stored in key-value storage, for example, using an identifier of the content item as a key. Presence table 1100 may be stored by presence data store 924, or may conceptually represent information retrieved by interaction synchronization module 916 from presence data store 924.

In this example, a presence record identifies a content item, a device id, a user id (for convenience represented here as a name), a user interface element id, a process id, and presence information. Each unique device id, user interface element id, and process id combination is associated with presence information. In this example, devices which are "not present" are not represented in presence table 1100. As shown by presence table 1100, individual users (Jim) and devices (e.g., device id 36abe87) may be associated with multiple presence records. The presence table in this embodiment describes information relating to individual processes and user interface elements operated by various users and devices as provided by interaction management module 204.

When presence information is received by interaction synchronization module 916, interaction synchronization module 916 accesses presence data store 924 to identify whether an existing presence record matches the device id, process id, and user interface element id of the received presence information. When no record matches this information, a new presence record is generated. The "user ID" of the new presence record may be included in the received information, or interaction synchronization module 916 may query another module or data store to identify the user associated with the device ID. The new presence record is stored in presence data store 924. When a matching presence record is identified in presence data store 924, the existing presence record is updated based on the received information. When the received information indicates the content item is no longer associated with the user interface element (e.g., because the relevant window has closed), the presence record may be removed from presence data store 924.

In this example, interaction synchronization module 916 also stores a presence record in presence table 1100 reflecting a user's request to be notified when a particular presence event occurs. In various embodiments, a user's notification request may be stored in any suitable way. The notification request is received by interaction synchronization module 916 as interaction information input via notification element 520 and sent to interaction synchronization module 916 by the device receiving the notification request. The notification request may be stored with sufficient information describing the notification request, such as the requesting device and the user requesting the notification. The user may be used to identify and notify alternate devices if the user is no longer using the device that provided the request.

Interaction synchronization module 916 may generate user presence table 1110 to maintain the current user presence relating to a content item. In other embodiments, the current user presence is stored without using user presence table 1110. User presence table 1110 indicates the presence of a user reflecting the presence records associated with the user devices of the user. The user presence is used by devices 100, for example, to display in presence indicators 500. In this way, even though a user may interact with a content item using several devices, processes, and user interface elements, only the presence reflecting the highest priority of interaction is distributed to other devices 100.

To determine the user presence, the presence information from each presence record associated with a user is identified. Then the presence information is matched against the user presence ordering to determine the highest priority ordering. With user John as an example, John is associated with three user presences. The presence records indicate that John is viewing the content item in a focused window of one user device (i.e., Device 9d7523c in user interface element id 1), and in two user interface elements of device 36abe87, the content item is being edited in the first and "open" in the second. Applying the ordering shown in FIG. 10, "editing" is the highest order presence associated with John. John's user presence is set to "editing" in user presence table 1110.

When a presence record is modified, the user presence is updated to reflect any changes in the user presence. For example, if John's "viewing" presence record is removed, John's user presence is not changed because an "editing" presence record remains. Likewise, if John's "editing" presence record changes to "open," John's presence status changes to "viewing" as the next-highest priority presence reflected in presence records associated with John. Note that the "viewing" presence record is associated with another device ID (9d7523c). Thus, John's presence is accurately reflected across several devices, processes, and user interface elements.

Figure 12:
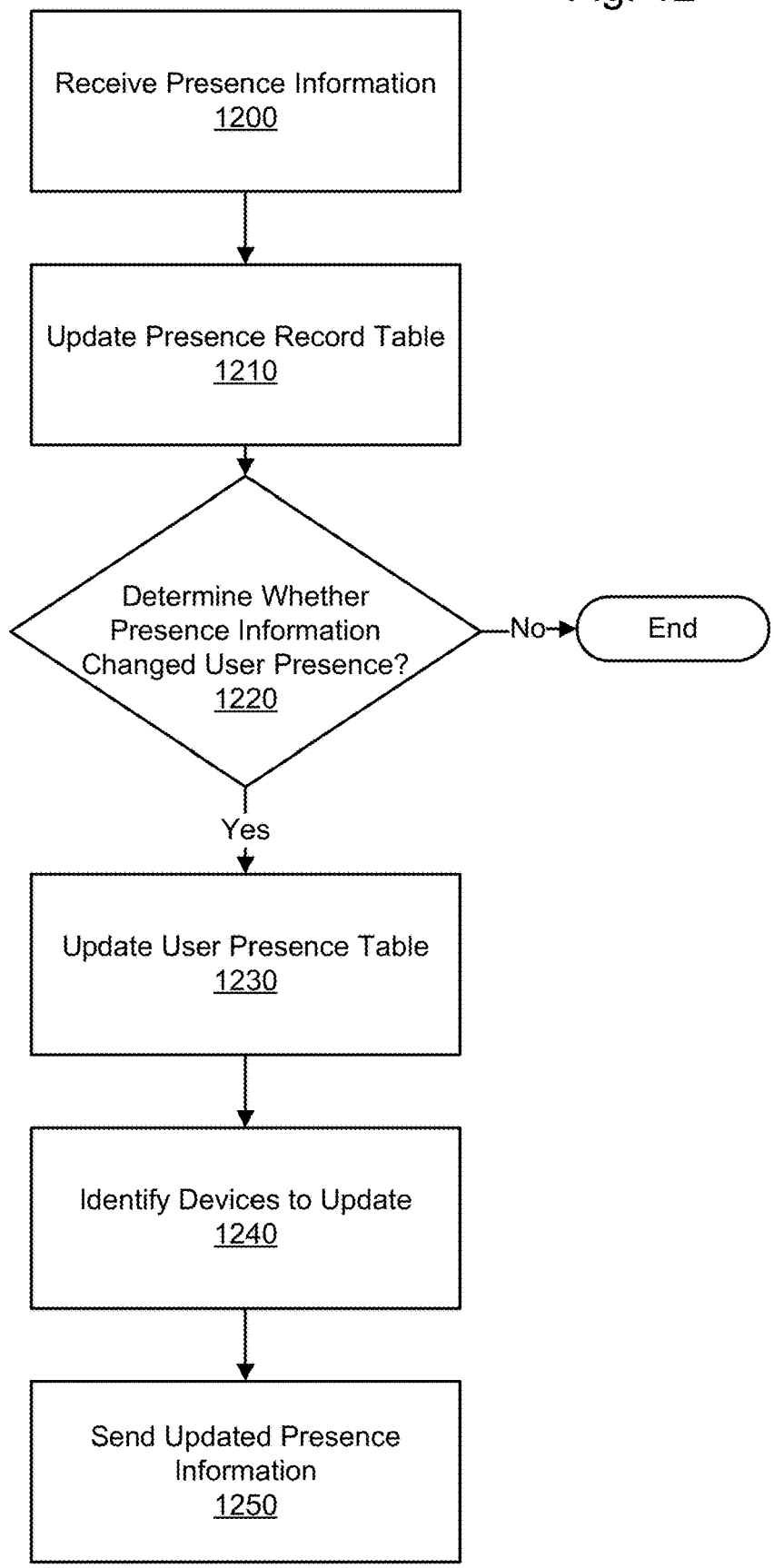
FIG. 12 shows a process of modifying a presence record and updating devices of user presence according to an embodiment.

FIG. 12 shows a process of modifying a presence record and updating devices 100 of user presence according to an embodiment. This process may be performed in one embodiment by interaction synchronization module 916. Presence information is received 1200 by interaction synchronization module 916. Interaction synchronization module 916 updates 1210 presence records in presence table 1100 by modifying existing presence records or adding a new presence record, as described above. Interaction synchronization module 916 next determines 1220 the user presence of the user associated with the updated presence record and determines whether the user presence is changed by the updated presence record. For example, a change in user presence may be determined by determining a new user presence and comparing the new user presence to the user presence stored in user presence table 1110. If the user presence was not changed, in one embodiment, the process ends. If the user presence changes, the user presence is updated 1230 in user presence table 1110.

In one embodiment, interaction synchronization module 916 determines whether a user interface element of a device has provided presence information within a threshold amount of time. When a user interface element has not provided presence information, interaction synchronization module 916 may request presence information from the device or consider the presence for the related user interface element to have ended ("not present"). Thus, interaction synchronization module 916 may "expect" a heartbeat relating to each user interface element that has provided recent presence information. When no presence information is received within the threshold amount of time, a "not present" presence may be generated for that user interface element.

Next, interaction synchronization module 916 identifies devices to update regarding the changed user presence. In one embodiment, any device synchronized with the content item is updated. In another embodiment, the presence table 1110 is consulted to determine devices with a presence associated with the content item. In addition, interaction synchronization module 916 determines whether any notifications are triggered by the change in user presence. Stored notifications are accessed and the conditions for the notification are compared to the changed presence related to the content item. Using identified devices, interaction synchronization module 916 sends 1250 the updated presence information to the identified devices. In one configuration, the user presence is provided to the identified devices. In another configuration, additional information may also be provided. In this way, user presence information is managed by content management system 110 to distribute presence information only when it affects the user presence that may actually displayed to a user, e.g., in a presence indicator or responsive to a notification request.

Additional interaction information provided by devices 100 is also processed by interaction synchronization module 916. Such interaction information includes a request to be notified when presence of a user changes, a request for version or metadata information, chat messages, and so forth as described with respect to FIG. 5B. As described above, notification requests may be stored and used to determine devices to notify when presence status changes. When version or metadata is requested, interaction synchronization module 916 retrieves such version and metadata information from content storage 920. Interaction synchronization module 916 may provide the version information and changes relative to various content item versions as described with respect to content storage 920. When a chat message is received for a content item, interaction synchronization module 916 queries presence data store 924 to identify device IDs associated with stored presence records for the content item and distributes the chat message to these identified devices.

When changes to a content item are made by a device, presence records may be used to intelligently and smoothly update individual user interface elements interacting with the content item. Such changes to a content item include moving the content item (e.g., to another folder or directory), deleting the content item, and committing a new version of the content item.

Figure 13:
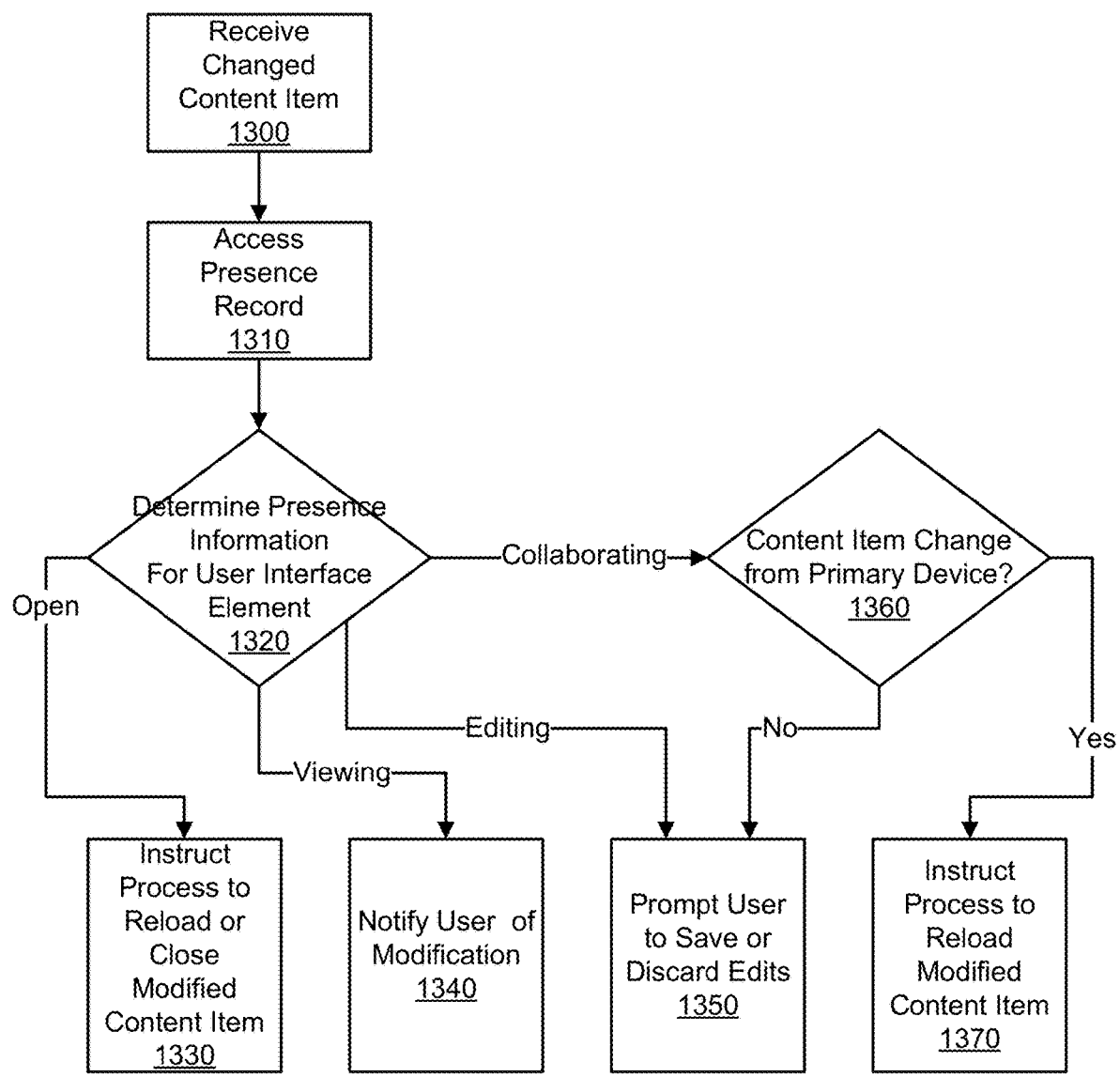
FIG. 13 shows a flowchart for a process that uses presence information to synchronize modifications to a content item.

FIG. 13 shows a flowchart for a process that uses presence information to synchronize modifications to a content item. This process may be performed by interaction synchronization module 916 or by client application 200, according to various embodiments. When a change to a content item is received 1300, presence records for the affected content item are accessed 1310 to determine 1320 the presence information associated with each user interface element. Depending on the presence of the user interface element and the change to the content item, an action is sent to the client application for the user interface element to perform to reconcile the user interface element with the change to the content item.

When a user interface element is associated with an "open" presence (i.e., the user interface element has interacted with the content item, but is not the active user interface element in the display), the action sent to the process controlling the user interface element typically instructs 1330 the process to seamlessly integrate the content item change. For example, when a new version of the content item is committed, the process is instructed to close and automatically re-open the new, changed content item. When the content item is moved, the process may be instructed to close the content item and re-open the content item at the new location. When the content item is deleted, the process may be instructed to close the content item. When the presence record indicates the user interface element is viewing (e.g., presently the active user interface element on the device), a user may be notified 1340 prior to performing the action described for the "open" presence information. In addition, the user may be notified 1340 of the specific change to the content item and prompted to perform further actions. While a user may not mind if a content item is moved to another folder, a user may prefer an option to save the current version of a content item prior to synchronizing a deletion or modification of the content item. The action in this circumstance may include prompting the user, e.g., via a supplemental user interface, whether to continue with synchronizing the modification, to save the current content item, or to continue viewing the current content item without change.

When the presence record indicates the user interface element is associated with editing the content item (e.g., the user interface element is associated with an unsaved modification of the content item), the action may prompt 1350 the user to preserve the content item, including any edits the user has made or to preserve the unedited version of the content item. For example, when the change deletes the content item, the action includes presenting an option to save the modified content item. When the change moves the content item, the action may assist in synchronizing the edited content item with the new location of the content item. For example, the action may instruct the client application 200 to save any modifications of the content item.

When the change commits a new version of the content item and the user interface element is associated with modifying the content item (e.g., an editing presence), the action may notify the user of the new version and prompt the user to save the user's changes to another document (to avoid a versioning conflict with the existing content item) or to discard the user's changes. The action may also attempt to merge the newly committed version with the modifications made in the user interface element. Such merging may include identifying the committed changes to the content item and instructing the user device to attempt to incorporate the committed changes to the content item in the user interface element.

When a presence record indicates the user interface element is associated with collaborating, collaboration module 207 or collaboration module 926 determines 1360 whether the change to the content item was made by the primary collaborating device. If the content item change was not made by the primary device, the user of the primary device is prompted 1350 to save or discard edits. In one embodiment, the option to save may additionally give an option to override the content item change to preserve the version of the content item being used in the collaboration.

If the content item change was made by the primary device, the action sent to the process controlling the user interface element typically instructs 1370 the process to seamlessly integrate the content item change. For example, when a new version of the content item is committed, the process is instructed to close and automatically re-open the new, changed content item.

Figure 14:
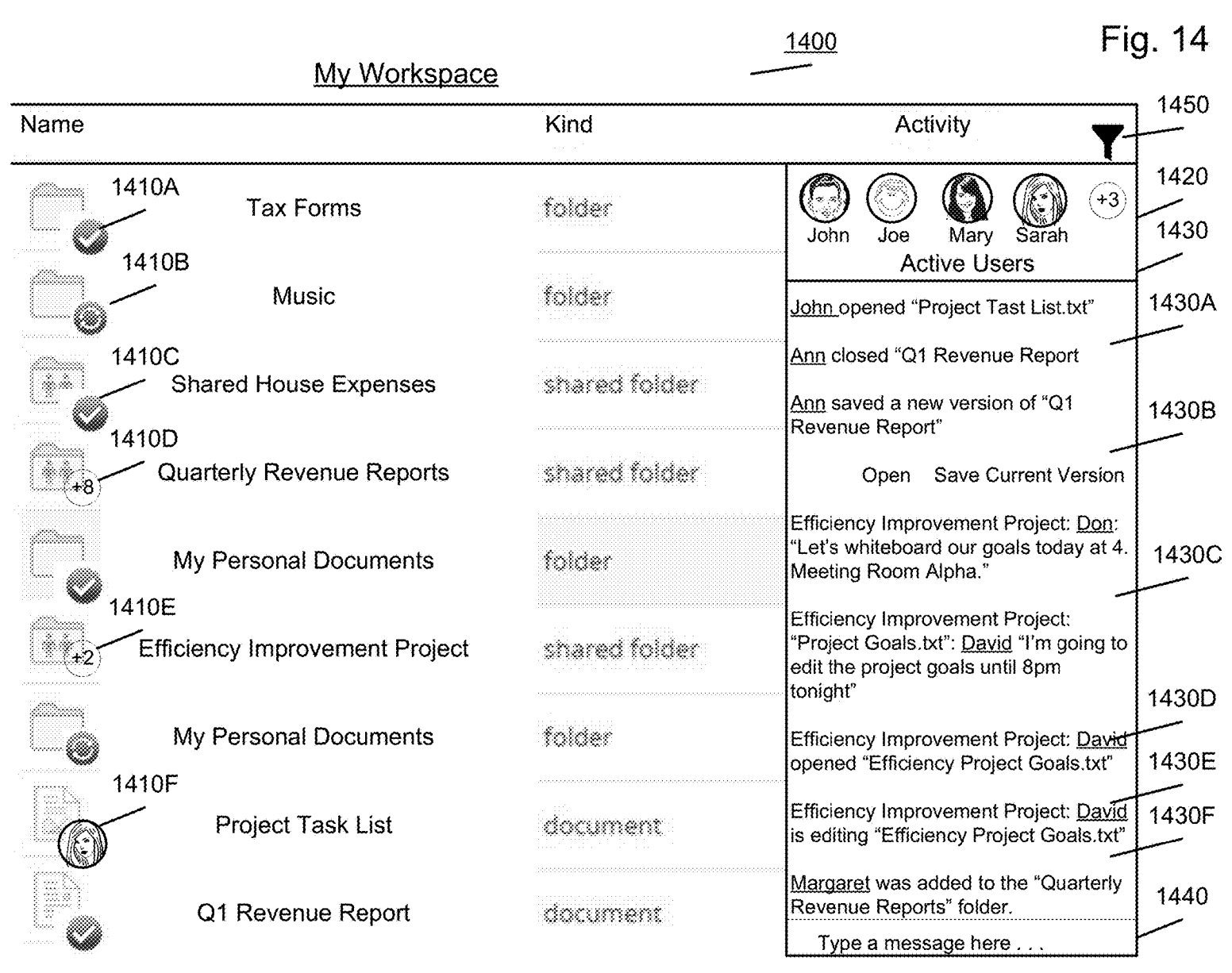

FIG. 14 shows a folder-level display of interaction information according to one embodiment. In the embodiment shown in FIG. 14, user interface module 202 on device 100 displays a browser 1400 to the user for navigating synchronized content items. The synchronized content items may be associated with individual folders or shared folders as described above. Browser 1400 displays content items synchronized with content management system 110 and permits the user to navigate synchronized content items and organizations of such content items. In the example shown in FIG. 14, browser 1400 shows a collection of content items for a shared folder. This view of a collection (e.g., a folder) is also termed a specific "organization" of content items displayed by browser 1400. The organization of a shared folder may be hierarchical, and may include, for example, several organizational elements within the collection. Each organizational element is a content item that further organizes content items within the organization. For example, one type of organizational element is a folder, which may include one or more folders within the folder. Other organizational elements may be used, such as a collection, a set, a playlist, or any other suitable grouping for organizing and managing content items. A user may hierarchically navigate an organization of content items by selecting organizational elements and navigating the organizational structure. Browser 1400 displays interaction information relating to the content items viewed in the browser 1400. In this way, as a user navigates shared and synchronized folders, the user may also view interactions with content items. As described further below, this permits a user to identify current and recent interactions with shared folders and content items.

In one embodiment, as interaction information is received by a client, the client associates the received interaction information with a shared folder and any related organizations and organizational elements. For example, a content item may be associated with folder A within a particular shared folder. The interaction information may be associated with the content item, the shared folder, and folder A. As shown in FIG. 14, browser 1400 may display several content items including organizational elements. In this example, browser 1400 shows several folder organizational elements, as well as content items "Project Task List" and "Q1 Revenue Report."

The interaction information and other information about synchronized content items is analyzed to generate a status indicator (specifically one of status indicators 1410A-F, and generally status indicator 1410) for each content item, including organizational elements. The status indicator provides visual information to display interaction information or synchronization status for a content item or organizational element. In this example, status indicator 1410 may indicate that the associated item (content item or organizational element) is up to date, is currently receiving updates or modifications, or is associated with presence information. Status indicators associated with an organizational element may be determined by identifying content items and further organizational elements contained by the organizational element, and displaying the status of the items contained by the organizational element.

In this example, status indicator 1410A indicates that the folder "Tax Forms" is currently synchronized with content management system 110. The folder "Tax forms" is an organizational element that is not shared with other users.

Status indicator 1410B indicates that the folder "Music" is currently receiving modifications and synchronizing the status of the content items within this organizational element with content management system 110.

Status indicator 1410C indicates that the folder "Shared House Expenses" is currently synchronized with content management system 110. This folder is shared with and synchronized by other users, as indicated by the designation "shared folder."

Status indicator 1410D indicates that the folder "Quarterly Revenue Reports" is currently associated with presence information relating to eight other users, as indicated by "+8". In this embodiment, the number of users with presence information relating to an organizational element or content item is designated by a counter. The presence information relating to "Quarterly Revenue Reports" is associated with content items and other organizational items organized by this organizational item. For example, six users may be associated with presence information relating to content items in "quarterly revenue reports," while two users may be associated with a further organizational element within "quarterly revenue reports." That is, a further folder may exist within "quarterly revenue reports" within which the two users may be interacting with content items. Since the user is viewing "quarterly revenue reports," as an organizational element (and not as the organization displayed by the browser), the browser displays information consolidated interaction information associated with the content items within "quarterly revenue reports." The user may select the organizational element to browse to the organizational element itself and further identify the content items being viewed or otherwise interacted with (e.g., edited) by other users.

Similarly, status indicator 1410E indicates that the folder "Efficiency Improvement Project" is currently associated with presence information relating to two other users as indicated by "+2".

Status indicator 1410F indicates that the content item "Project task list" is associated with presence information for a user whose icon is displayed. In various methods of displaying such information, the user's icon may be displayed, or the status indicator may show a+1 or other non-personalized indicator. In this way, in the browser 1400, a user may view interaction information relating to various content items and organizational elements associated with the view of the browser, permitting a user to see at-a-glance what items or organizational elements are being interacted with by other users.

In addition to status indicators 1410, browser 1400 may also display a list of active users 1420 associated with the various status indicators 1410. The user may interact with the list of active users 1420 in conjunction with filter icon 1450 to select individual users to view. For example, a user sees that user "John" in active users list 1420 is active and associated with presence information. The user may select filter 1450 to select "John" and the browser, managed by user interface module 202, filters the displayed interaction information to the information that relates only to "John."

In addition, a user may select a user in active users list 1420 (or otherwise) to identify specific content items that the user is interacting with. Specifically, the presence information associated with that user is identified and the resulting content items are displayed. This may permit a user to quickly identify which content item another user is active with, even if that user is active in a content item in a sub-sub-sub-folder or other organization element deep in an organizational hierarchy. Thus, the viewing user may quickly "find" where another user is active within the organization of content items.

The browser 1400 also displays an activity feed 1430 related to the view displayed to the user and the various content items and organizational elements associated with the organization currently displayed. The activity feed may display any interaction information as described with respect to a user's view of a content item discussed with respect to FIGS. 5A-5D. For example, activity feed 1430A displays when a user's presence changes (e.g., opening or closing a content item). Activity feed item 1430B indicates that a user has saved a new version of a file, and prompts a user to select a response, as previously discussed with respect to FIG. 13. In the browser 1400, modifications to a content item may not be displayed in activity feed 1430 until the modifications have been successfully synchronized to local content data store 208.

As shown by activity feed item 1430C, chat messages relating to a specific organization item (e.g., the folder "Efficiency Improvement Project") or relating to a specific content item (e.g., content item "Project Goals.txt") are displayed in the activity feed 1430. Similarly, changes in presence activities of a user with respect to a content item within an organizational item may also be displayed, as shown by activity feed items 1430D and 1430E.

Finally, the activity feed 1430 may also notify the user of various changes to metadata relating to a shared folder, content item, or organizational item. For example, modifications, deletions, or additions to a content item, or the addition 1430F of a new users to a shared folder. Users may also enter chat messages or other interaction information in a chat element 1440. This message is associated with the organizational view of the user, in this example with the "My Workspace" shared folder. This allows users to communicate about a content item or a folder or shared folder from the browser 1400 itself.

In this way, browser 1400 displays detailed presence and interaction information relating to various content items and organizational elements without requiring the user to enter a native application of a content item, and allows the user to view changes and data about a content item at a glance.

Accordingly, the presence associated with each user interface element is thus used to smooth the user experience when a content item is modified. Thus, a user may be notified of content item notifications prior to the user closing user interface elements, and reduces the likelihood that a user will be surprised if a content item changes or is deleted by a synchronization shortly after the user closes it.

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A non-transitory computer-readable storage medium storing instructions that, when executed by a computing system, cause the computing system to perform operations comprising:
   responsive to detecting, by a secondary device, a presence of a user of a primary device accessing a collaborative content item synchronized by a content management system with the secondary device and the primary device, generating for display using the secondary device a selectable collaboration option that, when selected, triggers a sending of a collaboration request to the primary device to collaborate on editing the collaborative content item with a user of the secondary device, the selectable collaboration option having not been displayed using the secondary device for an interval of time preceding the detecting of the presence of the user of the primary device based on the user of the primary device not having interacted with the collaborative content item during the interval of time;
   responsive to receiving user input comprising a selection of the selectable collaboration option, outputting a prompt comprising a plurality of selectable options each corresponding to a different version of the collaborative content item to be used during collaboration, wherein the plurality of selectable options includes an option corresponding to a changed version of the collaborative content item and an option corresponding to an unchanged version of the collaborative content item;
   responsive to receiving a selection of a selectable option of the plurality of selectable options, sending a collaboration request to the primary device, the collaboration request corresponding to a collaboration on the changed version of the collaborative content item or the unchanged version of the collaborative content item based on the selection of the option corresponding to the changed version or the option corresponding to the unchanged version, respectively; and
   displaying, by the secondary device within a user interface window of the secondary device, an interface portion that at least in part reflects a user interface window of the primary device and includes an instance of the collaborative content item on the primary device, the collaborative content item on the primary device reflecting the version corresponding to the selected option.

2. The computer-readable storage medium of claim 1, wherein the interface portion is displayed in response to receiving an acceptance of the collaboration request from the primary device.

3. The computer-readable storage medium of claim 1, wherein the interface portion is configured to display one or more interactions by a user of the primary device with the content item.

4. The computer-readable storage medium of claim 1, the operations further comprising:
   receiving, at the secondary device from the primary device, an offer to allow the secondary device to provide input to the primary device.

5. The computer-readable storage medium of claim 4, the operations further comprising:
   receiving, at the secondary device, a user input to accept the offer to allow the secondary device to provide input to the primary device; and
   sending, from the secondary device to the primary device, an input specifying an interaction with the content item, the input received from a user of the secondary device, wherein the primary device updates the instance of the content item on the primary device according to the input.

6. The computer-readable storage medium of claim 5, wherein the content item, in response to being updated on the primary device, is synchronized with the content management system and the secondary device.

7. The computer-readable storage medium of claim 1, wherein a collaboration element identifies one or more of the primary device, a user of the primary device, and a user account associated with the primary device.

8. A method comprising:
   responsive to detecting, by a secondary device, a presence of a user of a primary device accessing a collaborative content item synchronized by a content management system with the secondary device and the primary device, generating for display using the secondary device a selectable collaboration option that, when selected, triggers a sending of a collaboration request to the primary device to collaborate on editing the collaborative content item with a user of the secondary device, the selectable collaboration option having not been displayed using the secondary device for an interval of time preceding the detecting of the presence of the user of the primary device based on the user of the primary device not having interacted with the collaborative content item during the interval of time;
   responsive to receiving user input comprising a selection of the selectable collaboration option, outputting a prompt comprising a plurality of selectable options each corresponding to a different version of the collaborative content item to be used during collaboration, wherein the plurality of selectable options includes an option corresponding to a changed version of the collaborative content item and an option corresponding to an unchanged version of the collaborative content item;
   responsive to receiving a selection of a selectable option of the plurality of selectable options, sending a collaboration request to the primary device, the collaboration request corresponding to a collaboration on the changed version of the collaborative content item or the unchanged version of the collaborative content item based on the selection of the option corresponding to the changed version of the option corresponding to the unchanged version, respectively; and
   displaying, by the secondary device within a user interface window of the secondary device, an interface portion that at least in part reflects a user interface window of the primary device and includes an instance of the collaborative content item on the primary device, the collaborative content item on the primary device reflecting the version corresponding to the selected option.

9. The method of claim 8, wherein the interface portion is displayed in response to receiving an acceptance of the collaboration request from the primary device.

10. The method of claim 8, wherein the interface portion is configured to display one or more interactions by a user of the primary device with the content item.

11. The method of claim 8, further comprising: receiving, at the secondary device from the primary device, an offer to allow the secondary device to provide input to the primary device.

12. The method of claim 11, further comprising:
receiving, at the secondary device, a user input to accept the offer to allow the secondary device to provide input to the primary device; and
sending, from the secondary device to the primary device, an input specifying an interaction with the content item, the input received from a user of the secondary device, wherein the primary device updates the instance of the content item on the primary device according to the input.

13. The method of claim 12, wherein the content item, in response to being updated on the primary device, is synchronized with the content management system and the secondary device.

14. The method of claim 8, wherein a collaboration element identifies one or more of the primary device, a user of the primary device, and a user account associated with the primary device.

15. A system comprising:
at least one hardware processor; and
a non-transitory computer-readable storage medium storing executable computer instructions that, when executed by the at least one hardware processor, are configured to cause the at least one hardware processor to perform steps comprising:
responsive to detecting, by a secondary device, a presence of a user of a primary device accessing a collaborative content item synchronized by a content management system with the secondary device and the primary device, generating for display using the secondary device a selectable collaboration option that, when selected, triggers a sending of a collaboration request to the primary device to collaborate on editing the collaborative content item with a user of the secondary device, the selectable collaboration option having not been displayed using the secondary device for an interval of time preceding the detecting of the presence of the user of the primary device based on the user of the primary device not having interacted with the collaborative content item during the interval of time;
responsive to receiving user input comprising a selection of the selectable collaboration option, outputting a prompt comprising a plurality of selectable options each corresponding to a different version of for the collaborative content item to be used during collaboration, wherein the plurality of selectable options includes an option corresponding to a changed version of the collaborative content item and an option corresponding to an unchanged version of the collaborative content item;
responsive to receiving a selection of a selectable option of the plurality of selectable options, sending a collaboration request to the primary device, the collaboration request corresponding to a collaboration on the changed version of the collaborative content item or the unchanged version of the collaborative content item based on the selection of the option corresponding to the changed version or the option corresponding to the unchanged version, respectively; and
displaying, by the secondary device within the user interface window of the secondary device, an interface portion that at least in part reflects a user interface window of the primary device and includes an instance of the collaborative content item on the primary device, the collaborative content item on the primary device reflecting the version corresponding to the selected option.

16. The system of claim 15, wherein the interface portion is displayed in response to receiving an acceptance of the collaboration request from the primary device.

17. The system of claim 15, wherein the interface portion is configured to display one or more interactions by a user of the primary device with the content item.

18. The system of claim 15, the steps further comprising:
receiving, at the secondary device from the primary device, an offer to allow the secondary device to provide input to the primary device.

19. The system of claim 18, the steps further comprising:
receiving, at the secondary device, a user input to accept the offer to allow the secondary device to provide input to the primary device; and
sending, from the secondary device to the primary device, an input specifying an interaction with the content item, the input received from a user of the secondary device, wherein the primary device updates the instance of the content item on the primary device according to the input.

20. The system of claim 15, wherein a collaboration element identifies one or more of the primary device, a user of the primary device, and a user account associated with the primary device.

* * * * *

UNITED STATES PATENT AND TRADEMARK OFFICE
CERTIFICATE OF CORRECTION

PATENT NO. : 11,132,107 B2  
APPLICATION NO. : 16/257503  
DATED : September 28, 2021  
INVENTOR(S) : Matthew Eccleston et al.

Page 1 of 1

It is certified that error appears in the above-identified patent and that said Letters Patent is hereby corrected as shown below:

In the Claims

Column 38, Lines 1-2, Claim 15, delete "each corresponding to a different version of for the collaborative content" and insert --each corresponding to a different version of the collaborative content--.

Signed and Sealed this
Seventh Day of December, 2021

Drew Hirshfeld
*Performing the Functions and Duties of the*
*Under Secretary of Commerce for Intellectual Property and*
*Director of the United States Patent and Trademark Office*